US012744595B2

(12) United States Patent
Sugiyama et al.

(10) Patent No.: US 12,744,595 B2
(45) Date of Patent: Sep. 22, 2026

(54) OPTICAL TRANSMISSION LINE MONITORING DEVICE AND OPTICAL TRANSMISSION LINE MONITORING METHOD

(71) Applicant: 1FINITY Inc., Kawasaki (JP)

(72) Inventors: Junichi Sugiyama, Kawasaki (JP); Atsushi Kanai, Kawasaki (JP)

(73) Assignee: 1FINITY Inc., Kawasaki (JP)

( * ) Notice: Subject to any disclaimer, the term of this patent is extended or adjusted under 35 U.S.C. 154(b) by 204 days.

(21) Appl. No.: 18/887,071

(22) Filed: Sep. 17, 2024

(65) Prior Publication Data

US 2025/0141547 A1 May 1, 2025

(30) Foreign Application Priority Data

Oct. 30, 2023 (JP) ................................ 2023-185152

(51) Int. Cl.
*H04B 10/079* (2013.01)

(52) U.S. Cl.
CPC ..... *H04B 10/0799* (2013.01); *H04B 10/0795* (2013.01)

(58) Field of Classification Search
CPC ........................ H04B 10/0799; H04B 10/0795
USPC ............................................................ 398/25
See application file for complete search history.

(56) References Cited

U.S. PATENT DOCUMENTS 11,050,484 B2 * 6/2021 Oda et al. .............. H04B 10/25
2011/0249971 A1 * 10/2011 Oda et al. ............... H04J 14/04 398/65
2013/0004162 A1 * 1/2013 Osaka .................... H04B 10/08 398/34
2017/0019171 A1 1/2017 Doucet et al.
2018/0316422 A1 11/2018 Kato et al.
2020/0259562 A1 * 8/2020 Oda et al. ............ H04B 10/071
2020/0313771 A1 * 10/2020 Nakashima ........ H04B 10/2572
2020/0389230 A1 12/2020 Bergano
2023/0082206 A1 3/2023 Yokokura et al.

FOREIGN PATENT DOCUMENTS

JP 2018-186473 A 11/2018
JP 2020-202560 A 12/2020
JP 2023-43154 A 3/2023

* cited by examiner

*Primary Examiner* — Kenneth N Vanderpuye
(74) *Attorney, Agent, or Firm* — Fujitsu Intellectual Property Center

(57) ABSTRACT

Monitoring device is used in optical transmission system that transmits frames between first and second nodes via optical transmission line. First SOP data representing SOP detected in the first node and second SOP data representing SOP detected in the second node are stored in storage. Processor detects first time at which polarization fluctuation component caused by polarization fluctuation arrives at the monitoring device and generates reference data by extracting the first SOP data near the first time. The processor detects second time at which polarization fluctuation component caused by the polarization fluctuation arrives at the second node by searching for a section having SOP similar to the SOP represented by the reference data in the second SOP data. The processor determines a position where the polarization fluctuation occurs based on the first time and the second time.

8 Claims, 20 Drawing Sheets

TIME T0
NE
1A
2
2x
2y
P0
POLARIZATION FLUCTUATION
NE
1B

TIME T1
NE
1A
2x
2y
P0
3x
3y
NE
1B

TIME T2
NE
1A
2x
2y
P0
3x
3y
NE
1B

TIME T3
NE
1A
3y
2x
2y
P0
NE
1B

POLARIZATION FLUCTUATION SPEED
THRESHOLD
N
N
Tn
SOP WAVEFORM OF LOCAL NODE
TIME (COUNTER VALUE OF LOCAL NODE)

POLARIZATION FLUCTUATION SPEED
SOP WAVEFORM OF CORRESPONDENT NODE
N
N
Tm
TIME (COUNTER VALUE OF CORRESPONDENT NODE)

FIG.11A

| SOP_1 | FC | FDC |
| --- | --- | --- |
| SOP_2 | FC | FDC |
| SOP_3 | FC | FDC |
| ⋮ | | |
| SOP_15 | FC | FDC |
| SOP_16 | FC | FDC |

FIG.11B

| SOP_1 | FC | FDC |
| --- | --- | --- |
| SOP_2 | | |
| SOP_3 | | |
| ⋮ | | |
| SOP_15 | | |
| SOP_16 | | |

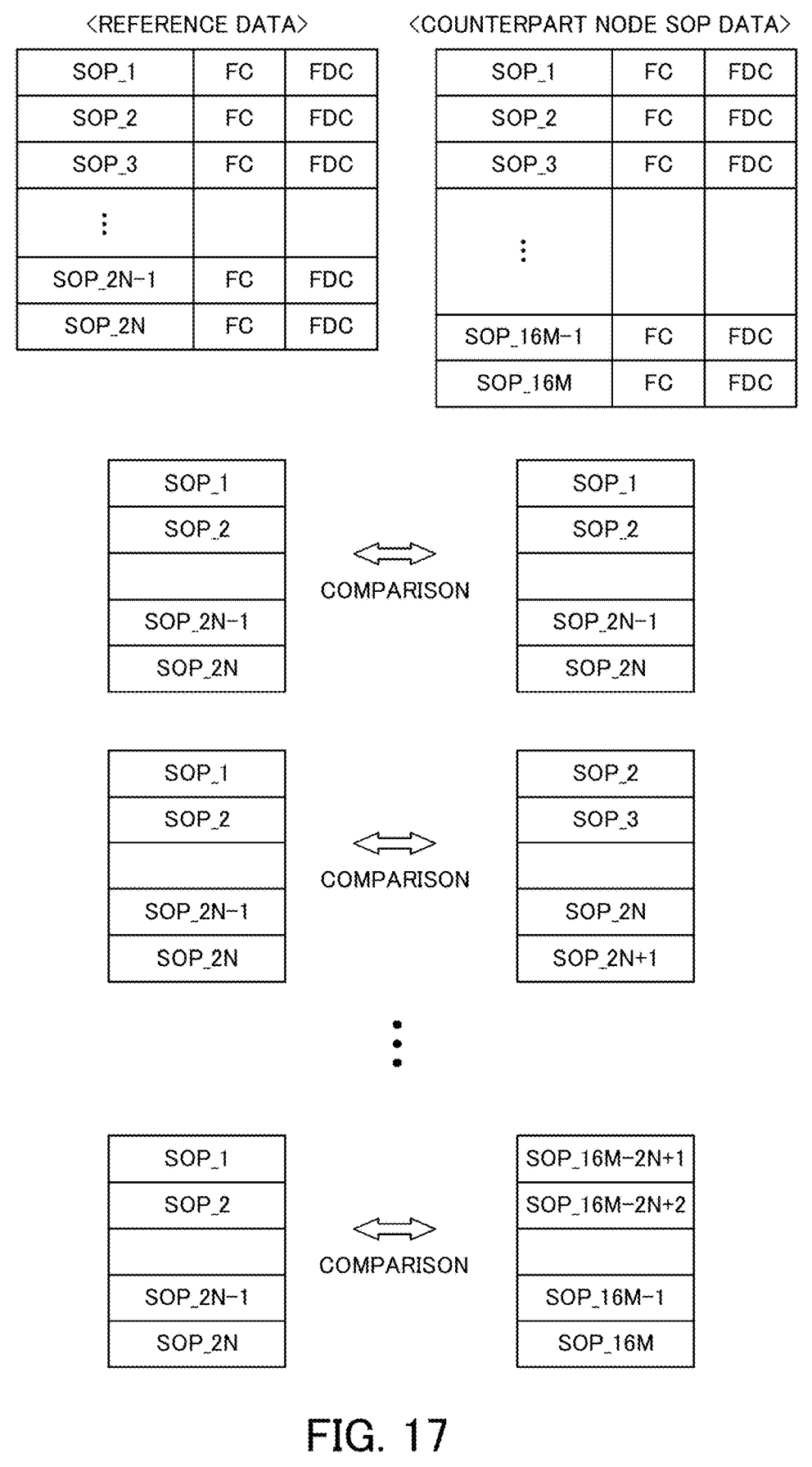

<REFERENCE DATA>

| SOP_1 | FC | FDC |
|---|---|---|
| SOP_2 | FC | FDC |
| SOP_3 | FC | FDC |
| ⋮ | | |
| SOP_2N-1 | FC | FDC |
| SOP_2N | FC | FDC |

<COUNTERPART NODE SOP DATA>

| SOP_1 | FC | FDC |
|---|---|---|
| SOP_2 | FC | FDC |
| SOP_3 | FC | FDC |
| ⋮ | | |
| SOP_16M-1 | FC | FDC |
| SOP_16M | FC | FDC |

FIG. 17

OPTICAL TRANSMISSION LINE MONITORING DEVICE AND OPTICAL TRANSMISSION LINE MONITORING METHOD

CROSS-REFERENCE TO RELATED APPLICATION

This application is based upon and claims the benefit of priority of the prior Japanese Patent Application No. 2023-185152, filed on Oct. 30, 2023, the entire contents of which are incorporated herein by reference.

FIELD

The embodiments discussed herein are related to a device and a method of monitoring an optical transmission line.

BACKGROUND

In an optical communication system, coherent transmission has become mainstream due to an increase in transmission speed. In coherent transmission, a signal is transmitted using a phase and a polarization of light. For this reason, when the polarization rapidly fluctuates on the optical transmission line, a burst error may occur in the reception node.

In addition, as the transmission capacity of the network increases, a modulation scheme in which the number of bits that can be transmitted by each symbol is large is adopted. However, in optical communication using such a modulation scheme, polarization fluctuation caused by shaking of an optical fiber, lightning strike, or the like may greatly affect communication quality. For this reason, a technique for specifying a position where polarization fluctuation occurs on an optical transmission line has attracted attention (for example, Japanese Laid-open Patent Publication No. 2023-043154).

The position where the polarization fluctuation occurs (polarization fluctuation position) may be specified based on, for example, the timing at which the polarization fluctuation is detected in one set of terminal nodes connected to both ends of the optical transmission line. However, the states of polarization (SOPs) detected at one set of terminal nodes are not the same. For this reason, there may be a case where the polarization fluctuation is detected at one terminal node, but the polarization fluctuation is not detected at the other terminal node. In this case, the polarization fluctuation position cannot be specified, or at least, it is difficult to accurately specify the polarization fluctuation position.

This problem can be solved, for example, by increasing the reception sensitivity of each terminal node. However, in this case, there is a possibility that the noise on the optical transmission line is determined as polarization fluctuation. Alternatively, a plurality of polarization fluctuation triggers may be detected for one polarization fluctuation event, and the specified polarization fluctuation position may have a large error.

SUMMARY

According to an aspect of the embodiments, an optical transmission line monitoring device is used in an optical transmission system that transmits a frame bidirectionally between the one set of terminal nodes via an optical transmission line. The optical transmission line monitoring device includes: a polarization state monitor that monitors a state of polarization of the optical transmission line; a first storage unit that stores first polarization state data representing a state of polarization detected by the polarization state monitor; a second storage unit that stores second polarization state data representing a state of polarization of the optical transmission line, the second polarization state data being detected by a correspondent node device provided in a second terminal node of the one set of terminal nodes; and a processor. The processor detects a first time representing a time at which a polarization fluctuation component caused by polarization fluctuation generated in the optical transmission line arrives at the optical transmission line monitoring device by comparing a polarization fluctuation value representing a fluctuation speed of polarization detected by the polarization state monitor with a specified threshold level. The processor generates reference data by extracting the first polarization state data near the first time from the first storage unit. The processor detects a second time representing a time at which a polarization fluctuation component caused by the polarization fluctuation arrives at the correspondent node device by searching for a section having a polarization state similar to the polarization state represented by the reference data in the second polarization state data. The processor determines a polarization fluctuation position representing a position where the polarization fluctuation occurs based on the first time and the second time.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 11A and 11B illustrate an example of SOP data;

FIG. 17 illustrates an example of a process of the similar section detection unit;

DESCRIPTION OF EMBODIMENTS

FIGS. 1A to 1D illustrate an example of a method of specifying an occurrence position of polarization fluctuation. In this example, an optical transmission system includes an optical transmission device (NE: Network Element) 1A and an optical transmission device (NE) 1B. The optical transmission device 1A and the optical transmission device 1B are connected to each other by an optical transmission line 2. That is, the optical transmission device 1A and the optical transmission device 1B are provided at both ends of the optical transmission line 2.

The optical transmission line 2 includes one set of an optical fiber 2*x* and an optical fiber 2*y*. The optical fiber 2*x* propagates an optical signal from the optical transmission device 1A to the optical transmission device 1B, and the optical fiber 2*y* propagates an optical signal from the optical transmission device 1B to the optical transmission device 1A. The optical fiber 2*x* and the optical fiber 2*y* are laid adjacent to each other. Although not particularly limited, the optical fiber 2*x* and the optical fiber 2*y* are accommodated in the same cable.

Figures 1A, 1B, 1C, 1D:
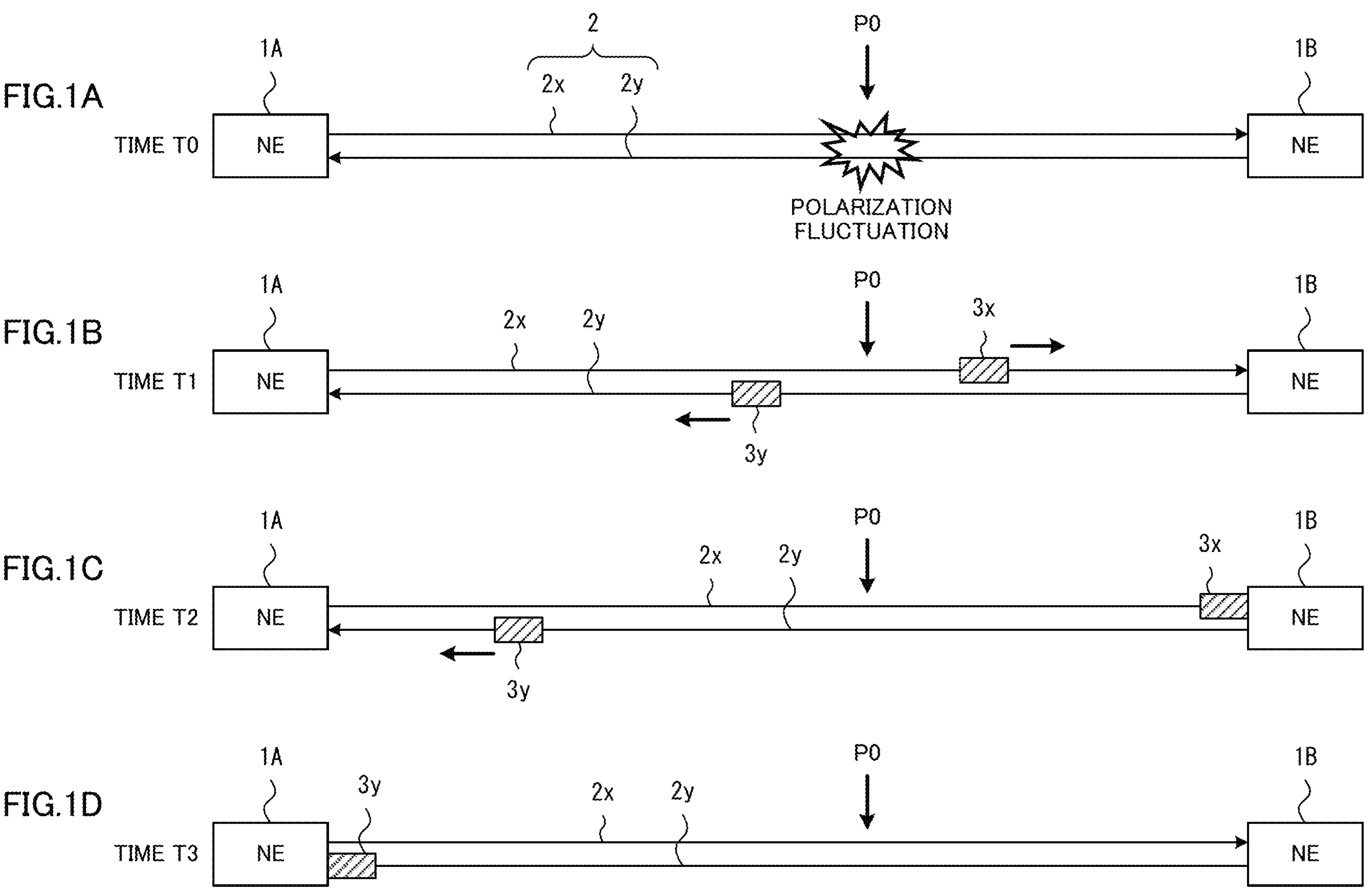
FIGS. 1A to 1D illustrate an example of a method of specifying an occurrence position of polarization fluctuation.

Here, as illustrated in FIG. 1A, it is assumed that the state of polarization (SOP) of the optical transmission line 2 rapidly fluctuates at time T0. In FIGS. 1A to 1D, P0 represents a position where polarization fluctuation occurs. In the following description, the position where the polarization fluctuation occurs may be referred to as a "polarization fluctuation position".

When the polarization of the optical transmission line 2 fluctuates, the polarization state of light propagating through the optical fibers 2*x* and 2*y* is affected. In the following description, an optical component whose polarization state is affected in the optical fiber 2*x* may be referred to as a polarization fluctuation component 3*x*, and an optical component whose polarization state is affected in the optical fiber 2*y* may be referred to as a polarization fluctuation component 3*y*.

The polarization fluctuation component 3*x* propagates from the position P0 toward the optical transmission device 1B via the optical fiber 2*x*. The polarization fluctuation component 3*y* propagates from the position P0 toward the optical transmission device 1A via the optical fiber 2*y*. Therefore, as illustrated in FIG. 1B, the polarization fluctuation components 3*x* and 3*y* reach positions separated from the position P0 by a specified distance at time T1.

Thereafter, the polarization fluctuation component 3*x* arrives at the optical transmission device 1B at time T2 as illustrated in FIG. 1C. Further, the polarization fluctuation component 3*y* arrives at the optical transmission device 1A at time T3 as illustrated in FIG. 1D. Then, the position P0 can be calculated based on the difference ΔT (=T3−T2) between the time T2 and the time T3. Here, it is assumed that a propagation time TL of light between the optical transmission devices 1A and 1B is obtained by measurement or calculation. In this case, a propagation time "T(A−P0)" between the optical transmission device 1A and the position P0 is expressed by Formula (1).

$$T(A-P0)=\frac{TL+\Delta T}{2} \tag{1}$$

Furthermore, a distance "D(A−P0)" between the optical transmission device 1A and the position P0 is expressed by Formula (2). n represents the refractive index of the optical fiber, and c represents the speed of light in vacuum.

$$D(A-P0)=\frac{c}{n}\times T(A-P0) \tag{2}$$

In this manner, the polarization fluctuation position P0 can be specified by measuring the time when the polarization fluctuation is detected at the nodes at both ends of the optical transmission line 2.

Figure 2:
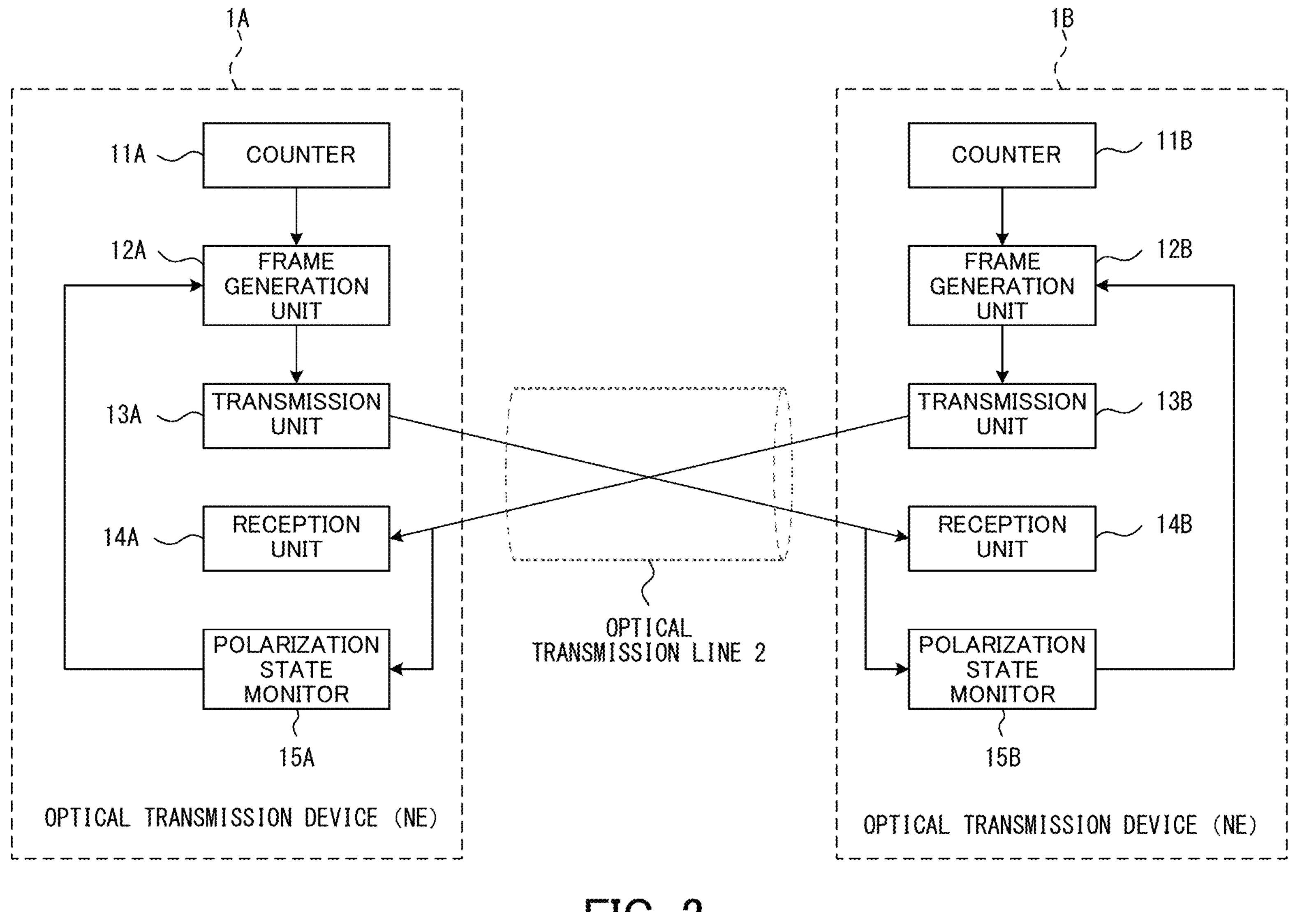
FIG. 2 illustrates an example of a configuration for specifying a polarization fluctuation position.

FIG. 2 illustrates an example of a configuration for specifying a polarization fluctuation position. Here, an optical transmission device (1A or 1B) is implemented on a terminal node of the optical transmission line 2. In the following description, each optical transmission device may be referred to as a "network element (NE)".

As illustrated in FIG. 1A, the optical transmission line 2 includes an optical fiber 2*x* that propagates an optical signal from the optical transmission device 1A to the optical transmission device 1B and an optical fiber 2*y* that propagates an optical signal from the optical transmission device 1B to the optical transmission device 1A. The optical fibers 2*x* and 2*y* have the same length and are laid on the same path. In addition, the optical fibers 2*x* and 2*y* are accommodated in the same cable. For example, an optical transport network (OTN) frame is transmitted between the optical transmission devices 1A and 1B.

The optical transmission device 1A includes a counter 11A, a frame generation unit 12A, a transmission unit 13A, a reception unit 14A, and a polarization state monitor 15A. The optical transmission device 1A may include other functions, circuits, or devices not illustrated in FIG. 2. For example, the optical transmission device 1A includes a frame pulse generation circuit that generates a frame pulse at a specified cycle.

The counter 11A operates in response to the frame pulse described above. As an example, the counter 11A outputs a counter value incremented in response to a frame pulse.

The frame generation unit 12A creates the overhead of the transmission frame in response to the frame pulse. A counter value output from the counter 11A is inserted into this overhead.

The transmission unit 13A transmits a frame including the overhead created by the frame generation unit 12A and a payload in which data is stored to the optical transmission device 1B. That is, the counter value generated by the optical transmission device 1A is notified to the optical transmission device 1B.

The reception unit 14A receives a frame transmitted from the optical transmission device 1B. Then, the reception unit 14A extracts the counter value from the overhead of the received frame. The configurations of the optical transmission device 1A and the optical transmission device 1B are substantially the same. That is, the counter value generated by the counter 11B of the optical transmission device 1B is inserted into the overhead of the frame transmitted from the optical transmission device 1B to the optical transmission device 1A. Therefore, the reception unit 14A can extract the counter value generated by the counter 11B of the optical transmission device 1B from the received frame.

The polarization state monitor 15A uses the optical signal received from the optical transmission device 1B to monitor the state of polarization generated in the optical transmission line between the optical transmission device 1A and the optical transmission device 1B. The polarization state monitor 15A may be implemented in, for example, a receiver that reproduces a symbol from a received optical signal.

Figure 3:
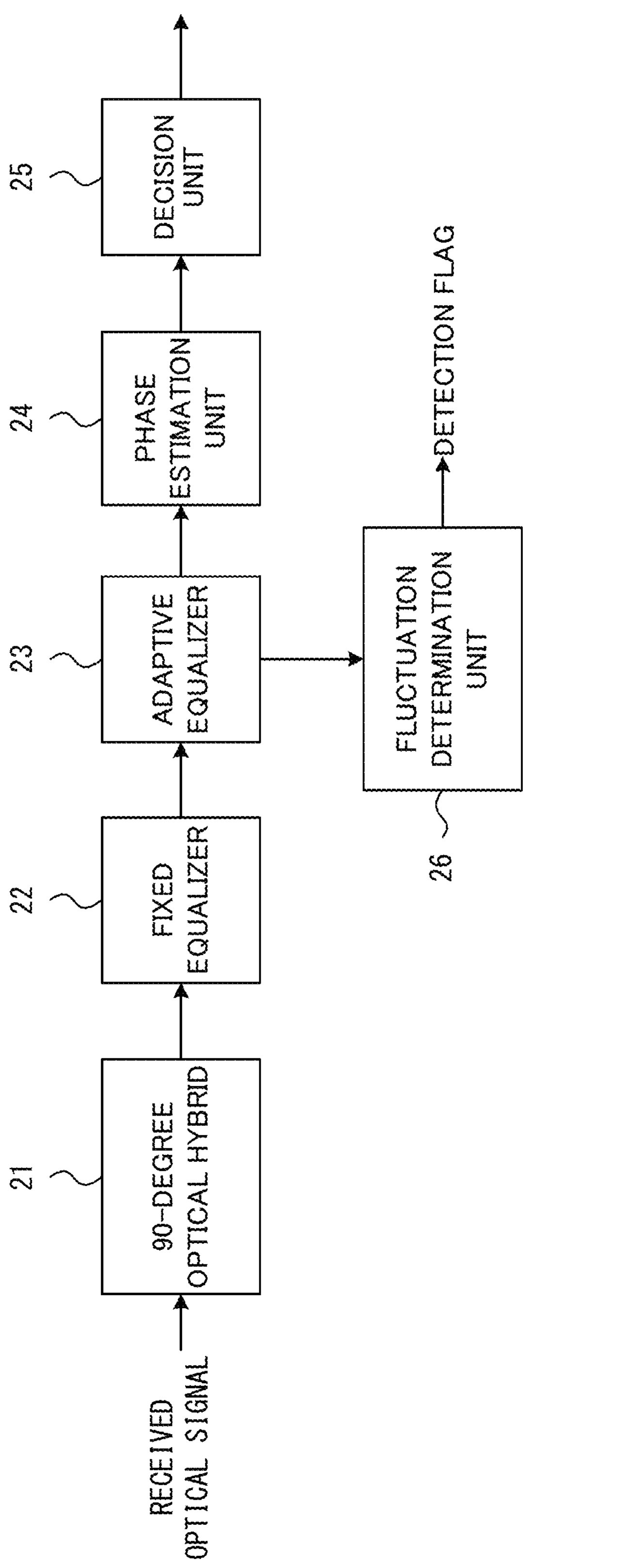
FIG. 3 illustrates an example of a method of monitoring polarization fluctuation.

FIG. 3 illustrates an example of a method of monitoring polarization fluctuation. The polarization fluctuation is detected by a receiver that receives an optical signal via the optical transmission line 2. In this embodiment, the receiver includes a 90-degree optical hybrid circuit 21, a fixed equalizer 22, an adaptive equalizer 23, a phase estimation unit 24, a decision unit 25, and a fluctuation determination unit 26.

The 90-degree optical hybrid circuit 21 generates an electric signal representing the electric field of the received optical signal using a local light source (not illustrated). The fixed equalizer 22 equalizes the output signal of the 90-degree optical hybrid circuit 21. For example, wavelength dispersion and the like are compensated for by the fixed equalizer 22. The adaptive equalizer 23 includes a digital filter such as an FIR filter, and adaptively equalizes the output signal of the fixed equalizer 22. Furthermore, the adaptive equalizer 23 performs polarization separation. At this time, the coefficient of each tap of the digital filter may be updated based on the input signal and the output signal of the adaptive equalizer 23.

The phase estimation unit 24 compensates for the phase offset of the output signal of the adaptive equalizer 23. As a result, the phase of each symbol is reproduced. The decision unit 25 reproduces the data assigned to each symbol in the transmission node based on the output signal of the phase estimation unit 24.

The fluctuation determination unit 26 monitors the polarization fluctuation generated in the optical transmission line 2 between the optical transmission device 1A and the optical transmission device 1B based on the output signal of the adaptive equalizer 23 or the tap coefficients of the digital filter included in the adaptive equalizer 23. When the polarization fluctuation level (alternatively, the polarization fluctuation speed) is larger than a specified threshold level, the fluctuation determination unit 26 outputs the polarization fluctuation detection flag. That is, the polarization fluctuation detection flag indicates that polarization fluctuation larger than a specified threshold level has occurred in the optical transmission line between the optical transmission device 1A and the optical transmission device 1B.

The fluctuation determination unit 26 (alternatively, the polarization state monitor) is implemented by, for example, a hardware circuit that processes a digital signal. Alternatively, the fluctuation determination unit 26 may be implemented by a processor system including a processor and a memory. In this case, the processor provides the function of the fluctuation determination unit 26 by executing a program that outputs the polarization fluctuation detection flag when detecting the polarization fluctuation.

The polarization state monitor 15A corresponds to the fluctuation determination unit 26 illustrated in FIG. 3. Alternatively, the polarization state monitor 15A corresponds to the 90-degree optical hybrid circuit 21, the fixed equalizer 22, the adaptive equalizer 23, and the fluctuation determination unit 26. Then, the polarization state monitor 15A outputs a polarization fluctuation detection flag when polarization fluctuation larger than a specified threshold level has occurred in the optical transmission line between the optical transmission device 1A and the optical transmission device 1B.

The polarization fluctuation detection flag is set to the overhead of the transmission frame by the frame generation unit 12A. Then, the frame in which the counter value and the polarization fluctuation detection flag are set is transmitted to the optical transmission device 1B. Therefore, the optical transmission device 1B can acquire the counter value of the optical transmission device 1A when the optical transmission device 1A detects the polarization fluctuation.

The optical transmission device 1B includes a counter 11B, a frame generation unit 12B, a transmission unit 13B, a reception unit 14B, and a polarization state monitor 15B. That is, the configuration of the optical transmission device 1B is substantially the same as that of the optical transmission device 1A. The counter 11A implemented in the optical transmission device 1A and the counter 11B implemented in the optical transmission device 1B perform the counting operation independently each other. However, the counter 11A and the counter 11B perform the counting operation in the same cycle.

The operation of the optical transmission device 1B is substantially the same as that of the optical transmission device 1A. Therefore, the optical transmission device 1B also monitors the polarization fluctuation generated in the optical transmission line 2. Then, when the polarization fluctuation larger than the threshold level is detected, a frame in which the counter value and the polarization fluctuation detection flag are set is transmitted from the optical transmission device 1B to the optical transmission device 1A. Therefore, the optical transmission device 1A can acquire the counter value of the optical transmission device 1B when the optical transmission device 1B detects the polarization fluctuation.

Figure 4:
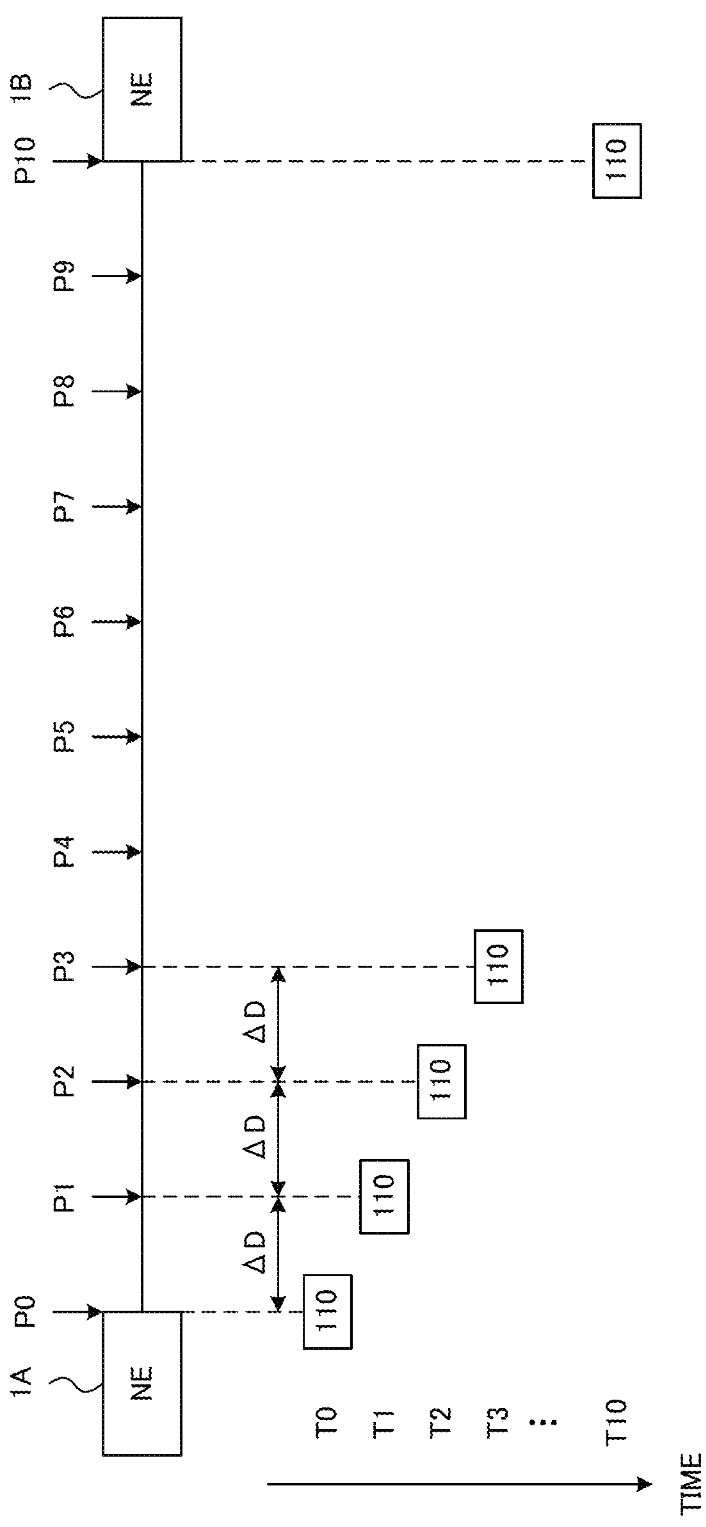
FIGS. 4 to 6 illustrate an example of transmission of a frame between optical transmission devices.
Figure 5:
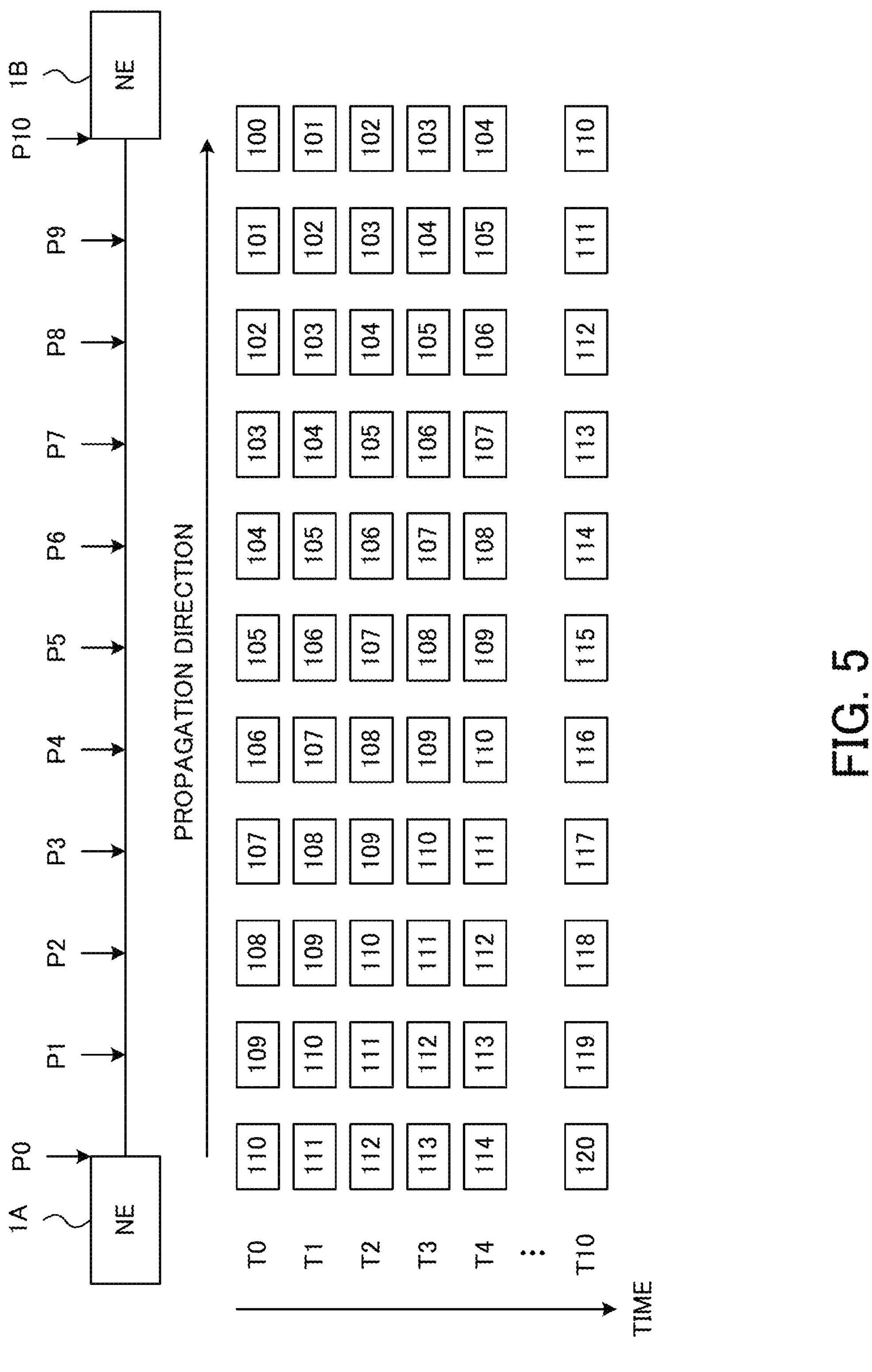
Figure 6:
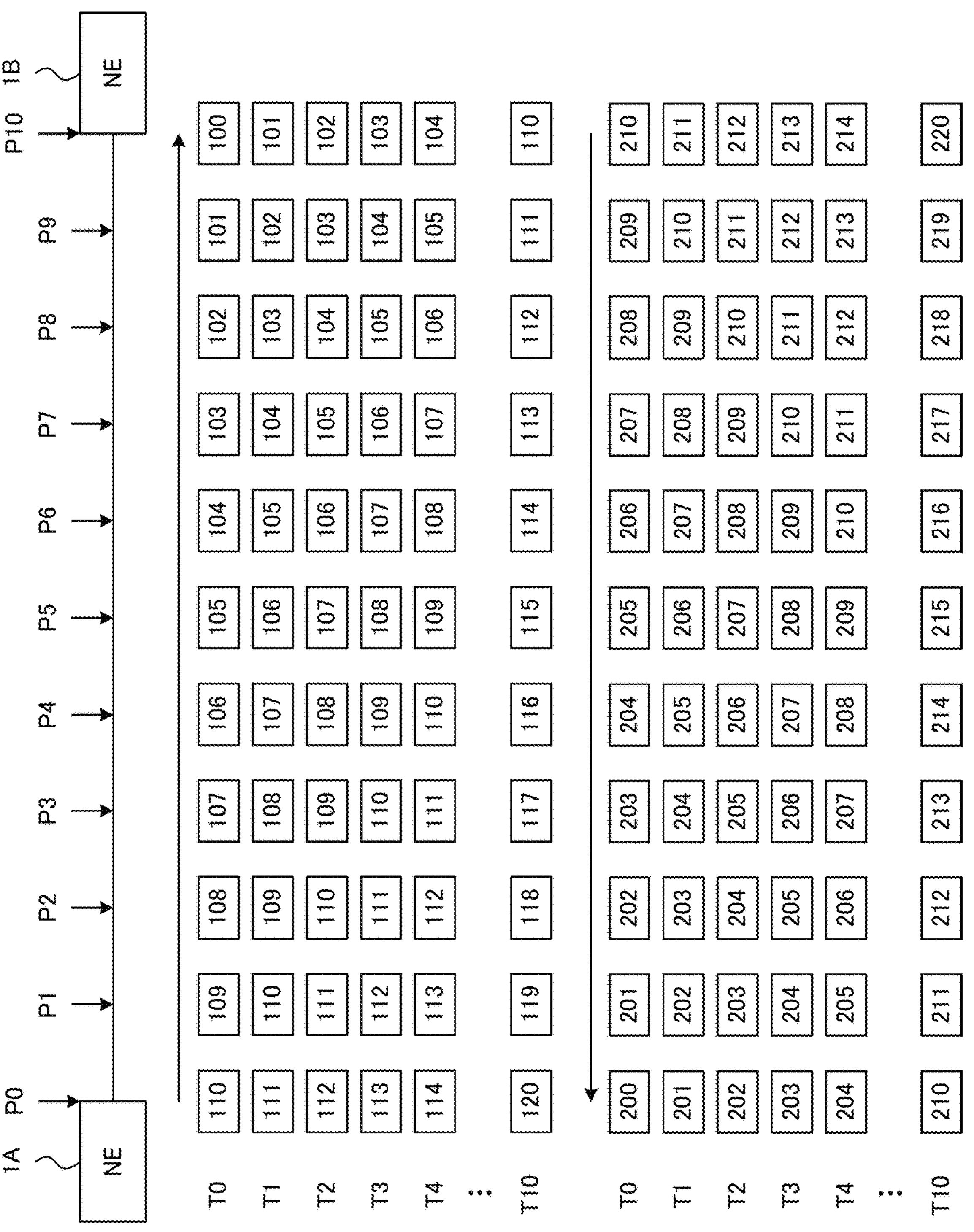

FIGS. 4 to 6 illustrate an example of transmission of a frame between the optical transmission devices 1A and 1B. Here, the counters 11A and 11B perform the counting operation at a specified cycle ΔT. In this embodiment, the cycle ΔT is 10 μs. That is, the counters 11A and 11B perform the counting operation at intervals of 10 μs.

At time T0, it is assumed that the counter value AFC output from the counter 11A implemented in the optical transmission device 1A is "110". Then, the optical transmission device 1A transmits a frame including the counter value to the optical transmission device 1B.

The frame transmitted from the optical transmission device 1A propagates through the optical fiber by the distance ΔD during the period ΔT. That is, at time T1 (T0+ΔT), the frame reaches a position (in FIG. 4, P1) separated from the optical transmission device 1A by ΔD. Here, in this example, ΔT is 10 μs. In addition, it is assumed that the speed of light is 300,000 km/sec and the refractive index of the optical fiber is 1.43. In this case, ΔD is about 2 km.

In this manner, the transmission frame propagates by the distance ΔD during the period ΔT. That is, the transmission frame passes through the position P2 (a position separated from the optical transmission device 1A by 2ΔD) at time T2 (T0+2ΔT), and passes through the position P3 (a position separated from the optical transmission device 1A by 3ΔD) at time T3 (T0+3ΔT). Then, in this embodiment, the transmission frame arrives at the optical transmission device 1B at time T10 (T0+10ΔT). Here, ΔD is 2 km. Therefore, the transmission distance between the optical transmission devices 1A and 1B is 20 km.

The counter 11A performs a counting operation in a cycle ΔT. That is, the counter value AFC output from the counter 11A is incremented in the cycle ΔT. For example, as illustrated in FIG. 5, in a case where the counter value AFC generated at the time T0 is "110", the counter value AFC generated at the time T1 (T0+ΔT) is "111", and the counter value AFC generated at the time T2 (T0+2ΔT) is "112". Then, every time a new counter value is generated, the optical transmission device 1A generates a frame including each counter value and transmits the frame to the optical transmission device 1B. In the following description, a frame in which the counter value inserted in the overhead is "i" may be referred to as a "frame i".

As described above, each frame transmitted from the optical transmission device 1A propagates through the optical fiber by the distance ΔD during the period ΔT. Therefore, for example, the frame 110 transmitted from the optical transmission device 1A at time T0 reaches the position P1 at time T1 and reaches the position P2 at time T2. Furthermore, the frame 111 transmitted from the optical transmission device 1A at time T1 reaches the position P1 at time T2 and reaches the position P2 at time T3.

Therefore, at the time Ti (i=0, 1, 2 . . . ), the frame is located at each of the positions P0 to P10. For example, at time T1, frames 111 to 101 are located at positions P0 to P10, respectively. Further, at time T2, frames 112 to 102 are located at positions P0 to P10, respectively. The position P0 and the position P10 represent the positions of the optical transmission device 1A and the optical transmission device 1B, respectively.

Similarly to the optical transmission device 1A, the optical transmission device 1B generates a frame including the counter value BFC generated by the counter 11B, and transmits the frame to the optical transmission device 1A. However, the counter 11A implemented in the optical transmission device 1A and the counter 11B implemented in the optical transmission device 1B perform the counting operation independently of each other. Therefore, the counter values generated by the counters 11A and 11B at a certain time are usually different from each other.

In the example illustrated in FIG. 6, at time T0, the counter value AFC generated by the counter 11A in the optical transmission device 1A is "110", and the counter value BFC generated by the counter 11B in the optical transmission device 1B is "210". Furthermore, at time T1, the counter value AFC generated by the counter 11A in the optical transmission device 1A is "111", and the counter value BFC generated by the counter 11B in the optical transmission device 1B is "211".

The frame transmitted from the optical transmission device 1B propagates from the optical transmission device 1B to the optical transmission device 1A through the optical fiber by the distance ΔD during the period ΔT. Therefore, for example, the frame 210 transmitted from the optical transmission device 1B at time T0 reaches the position P9 at time T1 and reaches the position P8 at time T2. Furthermore, the frame 211 transmitted from the optical transmission device 1B at time T1 reaches the position P9 at time T2 and reaches the position P8 at time T3. Therefore, at time T1, frames 211 to 201 are located at positions P10 to P0, respectively. Further, at time T2, frames 212 to 202 are located at positions P10 to P0, respectively.

In the optical network in which the above-described frame transmission is performed, each of the optical transmission devices 1A and 1B monitors the state of polarization. Then, when polarization fluctuation occurs in the optical transmission line 2, each of the optical transmission devices 1A and 1B detects the polarization fluctuation.

Figure 7:
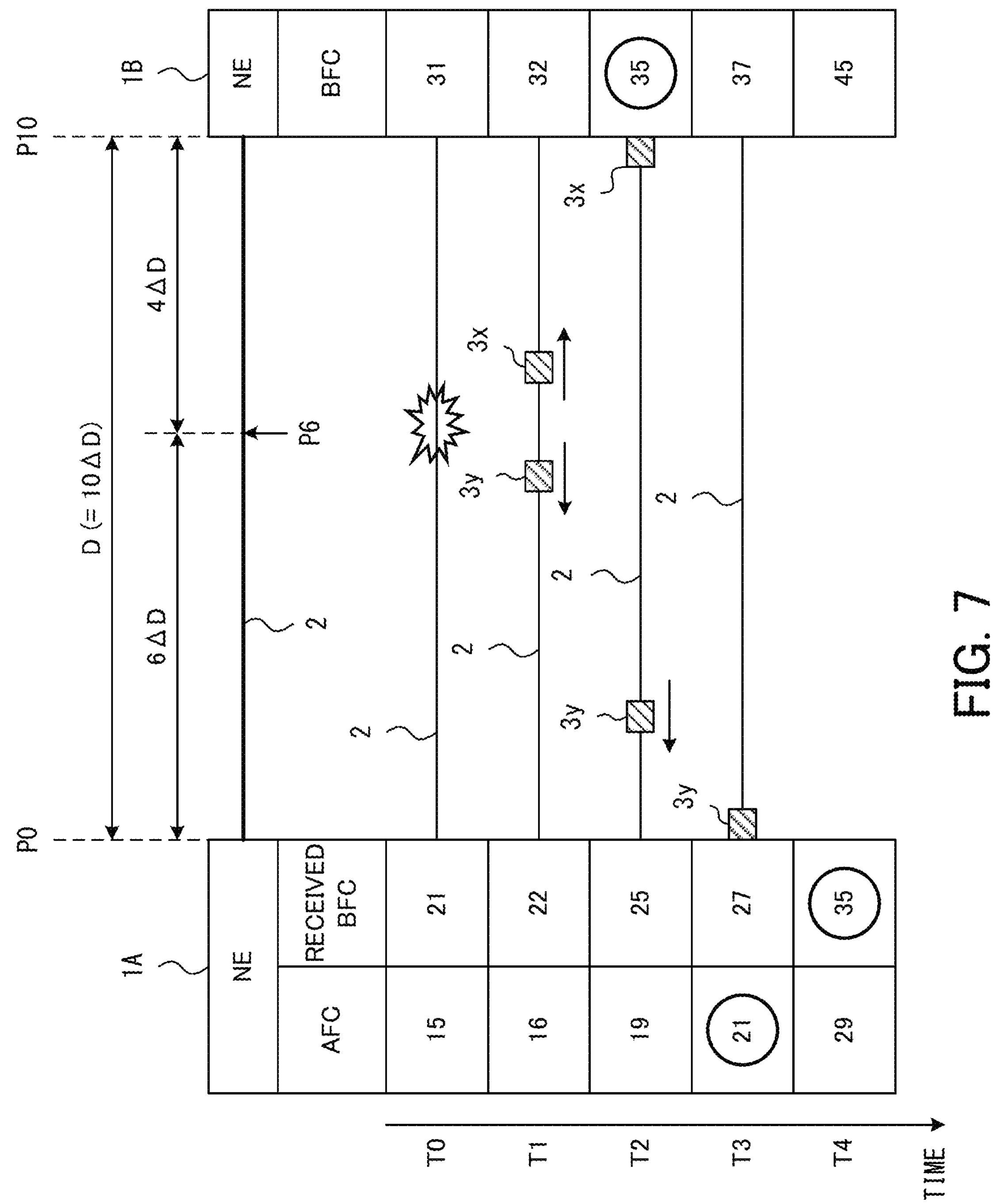
FIG. 7 illustrates an example of a method of specifying a polarization fluctuation position.

FIG. 7 illustrates an example of a method of specifying a polarization fluctuation position. In this example, the optical transmission line 2 is provided between the optical transmission devices 1A and 1B. The length of the optical transmission line 2 (that is, the distance D between the optical transmission devices 1A and 1B) is 10ΔD. AD is a distance at which light propagates through the optical transmission line 2 in a cycle ΔT corresponding to the transmission cycle of the frame. In FIG. 7, AFC represents the counter value output from the counter 11A in the optical transmission device 1A. BFC represents the counter value output from the counter 11B in the optical transmission device 1B. The received BFC represents the counter value BFC received by the optical transmission device 1A from the optical transmission device 1B. In this embodiment, it is assumed that the optical transmission device 1A determines the polarization fluctuation position.

At time T0, polarization fluctuation occurs at the position P6. The position P6 is separated from the optical transmission device 1A by 6ΔD and separated from the optical transmission device 1B by 4ΔD. At time T0, the counter value AFC of the optical transmission device 1A is "15", and the counter value BFC of the optical transmission device 1B is "31". Thereafter, the polarization fluctuation component 3$x$ is propagated toward the optical transmission device 1B via the optical transmission line 2, and the polarization fluctuation component 3$y$ is propagated toward the optical transmission device 1A via the optical transmission line 2.

Each of the optical transmission devices 1A and 1B transmits the counter value of its own node to the correspondent node via the optical transmission line 2. In addition, in this embodiment, the time during which the frame propagates from the optical transmission device 1B to the optical transmission device 1A is 10ΔT. Therefore, the counter value BFC received by the optical transmission device 1A from the optical transmission device 1B at the time T0 is "21".

At time T1 (time T0+ΔT), the polarization fluctuation component 3$x$ reaches a position separated by ΔD from the position P6 toward the optical transmission device 1B, and the polarization fluctuation component 3$y$ reaches a position separated by ΔD from the position P6 toward the optical transmission device 1A. At this time, the counter value AFC of the optical transmission device 1A is "16", and the counter value BFC of the optical transmission device 1B is "32".

At time T2 (T0+4ΔT), the polarization fluctuation component 3$x$ arrives at the optical transmission device 1B. Therefore, the optical transmission device 1B detects the polarization fluctuation larger than the threshold level at time T2. At this time, the counter value BFC of the optical transmission device 1B is "35". Therefore, at time T2, the optical transmission device 1B generates a frame in which "BFC=35" and the polarization fluctuation detection flag are inserted, and transmits the frame to the optical transmission device 1A.

At time T3 (T0+6ΔT), the polarization fluctuation component 3$y$ arrives at the optical transmission device 1A. Therefore, the optical transmission device 1A detects the polarization fluctuation larger than the threshold level at time T6. Then, the optical transmission device 1A waits for the polarization fluctuation detection flag transmitted from the optical transmission device 1B.

The propagation time between the optical transmission devices 1A and 1B is 10ΔT. Therefore, the frame, into which "BFC=35" and the polarization fluctuation detection flag are inserted, transmitted from the optical transmission device 1B at time T2 arrives at the optical transmission device 1A at time T4 (T2+10ΔT). As a result, the optical transmission device 1A recognizes that the optical transmission device 1B has detected polarization fluctuation when the counter value BFC of the optical transmission device 1B is "35". In addition, the optical transmission device 1A detects polarization fluctuation at time T3.

The optical transmission device 1A calculates a difference between the counter value BFC (received counter value BFC) set in the frame received from the optical transmission device 1B at the time (that is, T3) when the polarization fluctuation is detected and the counter value BFC (received counter value BFC) of the optical transmission device 1B when the optical transmission device 1B detects the polarization fluctuation. In this embodiment, the received counter value BFC acquired at the time T3 when the optical transmission device 1A detects the polarization fluctuation is "27". Furthermore, the counter value BFC when the optical transmission device 1B detects polarization fluctuation is "35". Therefore, the difference is "8". Further, by dividing the difference by "2", the propagation time between the polarization fluctuation position and the optical transmission device 1B can be obtained. In this embodiment, "4" is obtained. Therefore, it is determined that the polarization fluctuation position is separated from the optical transmission device 1B by 4ΔD. As described above, according to the configuration illustrated in FIG. 2, the polarization fluctuation position is specified by detecting the polarization fluctuation at the nodes at both ends of the optical transmission line 2.

Figure 8:
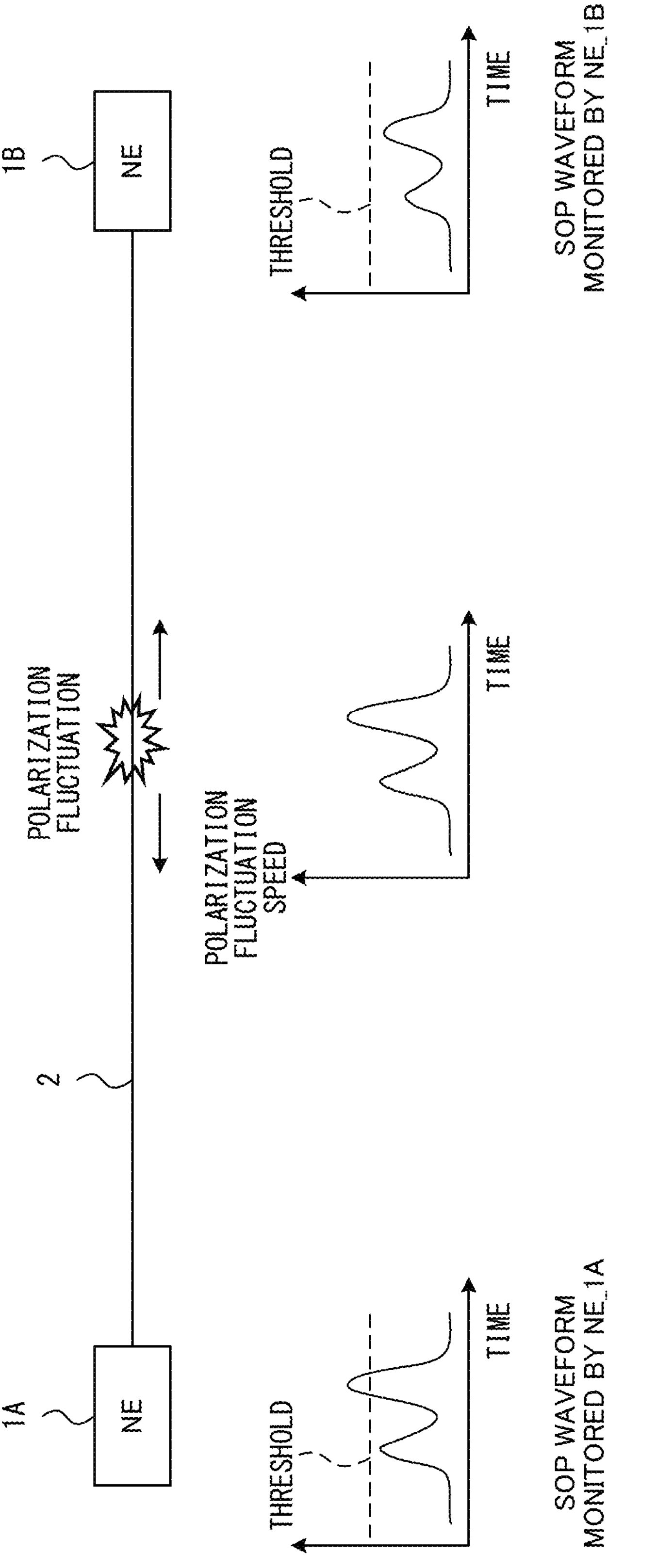
FIG. 8 is a diagram illustrating a problem of a method for detecting polarization fluctuation at both terminal nodes.

However, when polarization fluctuation occurs in the optical transmission line 2, the polarization fluctuation speed (or polarization fluctuation level) detected at one terminal node may be different from the polarization fluctuation speed detected at the other terminal node. For example, in the case illustrated in FIG. 8, the polarization fluctuation level detected in the optical transmission device 1B is smaller than the polarization fluctuation level detected in the optical transmission device 1A. Here, when the detected polarization fluctuation level is larger than a specified threshold level, the optical transmission devices 1A and 1B determine that polarization fluctuation has occurred in the optical transmission line 2. In this example, as illustrated in FIG. 8, the polarization fluctuation level detected in the optical transmission device 1A is larger than the threshold level, but the polarization fluctuation level detected in the optical transmission device 1B is smaller than the threshold level.

In this case, the optical transmission device 1A detects the polarization fluctuation, but the optical transmission device 1B does not detect the polarization fluctuation. Then, the optical transmission device 1A cannot specify the polarization fluctuation position by the method with reference to FIG. 7. Therefore, the optical transmission line monitoring device according to the embodiment of the present disclosure has a function of solving this problem.

Figures 9A, 9B:
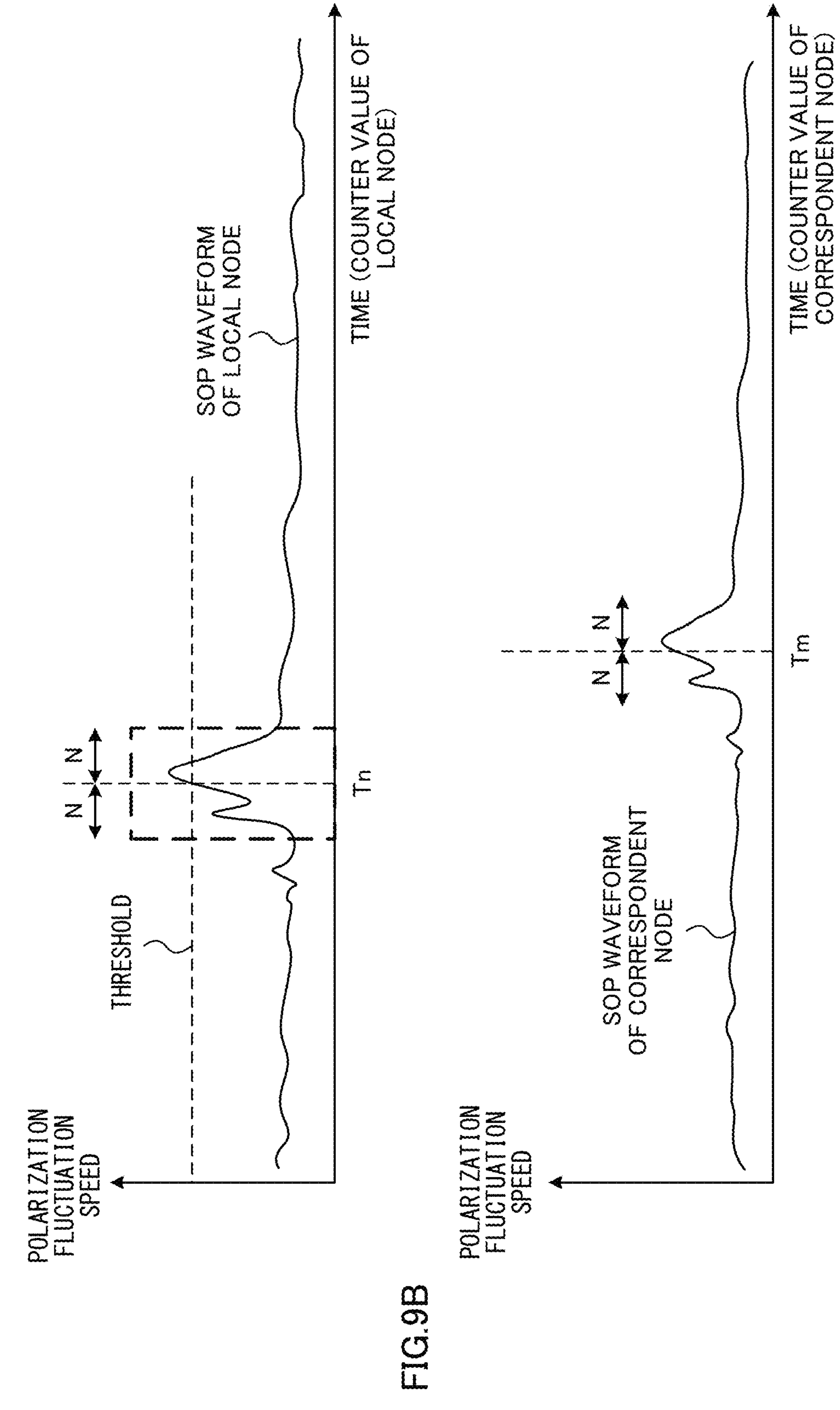
FIGS. 9A and 9B illustrate an outline of an optical transmission line monitoring method according to an embodiment of the present disclosure.

FIGS. 9A and 9B are diagrams illustrating an outline of an optical transmission line monitoring method according to an embodiment of the present disclosure. In this example, an optical transmission line monitoring device is provided at one of the terminal nodes of the optical transmission line 2. For example, the optical transmission line monitoring device may be provided in the optical transmission device. In the following description, the other terminal node of the optical transmission line 2 may be referred to as a "correspondent node (or remote node)". Further, a device provided in the correspondent node for specifying the polarization fluctuation position may be referred to as a "correspondent node device". The correspondent node device is provided in the optical transmission device in the correspondent node.

The optical transmission line monitoring device continuously monitors the state of polarization of the optical transmission line 2 based on the received optical signal. The monitoring result is sequentially stored in a first-in first-out (FIFO) memory. At this time, the polarization fluctuation value representing the change in the state of polarization is sampled at a specified cycle and written in the FIFO memory. As a result, polarization state data representing a change in the polarization state with respect to time is obtained. FIG. 9A illustrates polarization state data detected by the optical transmission line monitoring device. In the following description, the polarization state data detected by the optical transmission line monitoring device may be referred to as "local node SOP data". In addition, a waveform represented by the local node SOP data may be referred to as a "local node SOP waveform". Note that the sampling timing in the optical transmission line monitoring device is represented by a counter value of a counter included in the optical transmission line monitoring device.

The correspondent node device also monitors the state of polarization of the optical transmission line 2 based on the received optical signal. Then, the correspondent node device transmits the monitoring result to the optical transmission line monitoring device. That is, the polarization state data obtained in the correspondent node device is transmitted from the correspondent node device to the optical transmission line monitoring device. FIG. 9B illustrates polarization state data detected by the correspondent node device. Note that, in the following description, the polarization state data detected by the correspondent node device be may referred to as "correspondent node SOP data". In addition, a waveform represented by the correspondent node SOP data may be referred to as a "correspondent node SOP waveform". Note that the sampling timing in the correspondent node device is represented by a counter value of a counter included in the correspondent node devices.

As illustrated in FIG. 9A, the optical transmission line monitoring device compares the polarization fluctuation level (alternatively, the polarization fluctuation speed) detected in the local node with a specified threshold level. Then, when the polarization fluctuation level larger than the threshold level is detected, the optical transmission line monitoring device determines that the polarization fluctuation occurs in the optical transmission line 2. In this case, the optical transmission line monitoring device extracts a waveform in a period in the vicinity of the time at which the polarization fluctuation level exceeds the threshold level from the local node SOP waveform. In this embodiment, the polarization fluctuation level exceeds the threshold level at time Tn. Then, the local node SOP waveform within the period from the time Tn−N to the time Tn+N is extracted. In the following description, the waveform extracted in this way may be referred to as a "reference SOP waveform".

N that defines the period of the reference SOP waveform is preferably determined based on polarization fluctuation that can actually occur in the optical transmission line 2. For example, the period during which the polarization fluctuation occurs due to the lightning strike is several 10 μs. Therefore, N may be about several 10 μs to 100 μs. Note that N may be a value converted into a frame cycle.

Subsequently, the optical transmission line monitoring device searches for a section having a waveform similar to the reference SOP waveform in the correspondent node SOP waveform. In this embodiment, the correspondent node SOP waveform at time Tm±N illustrated in FIG. 9B is similar to the reference SOP waveform. In this case, the optical transmission line monitoring device determines that time Tm of the correspondent node SOP waveform corresponds to the time Tn of the own station SOP waveform. That is, the optical transmission line monitoring device estimates that the correspondent node device has detected the polarization fluctuation at the time Tm.

Here, Tn illustrated in FIG. 9A represents time when the optical transmission line monitoring device detects polarization fluctuation, and corresponds to the counter value AFC "21" illustrated in FIG. 7. In addition, Tm illustrated in FIG. 9B represents time when the correspondent node device detects the same polarization fluctuation, and corresponds to the counter value BFC "35" illustrated in FIG. 7. Therefore, the optical transmission line monitoring device can specify the polarization fluctuation position by the method described with reference to FIG. 7.

Figure 10:
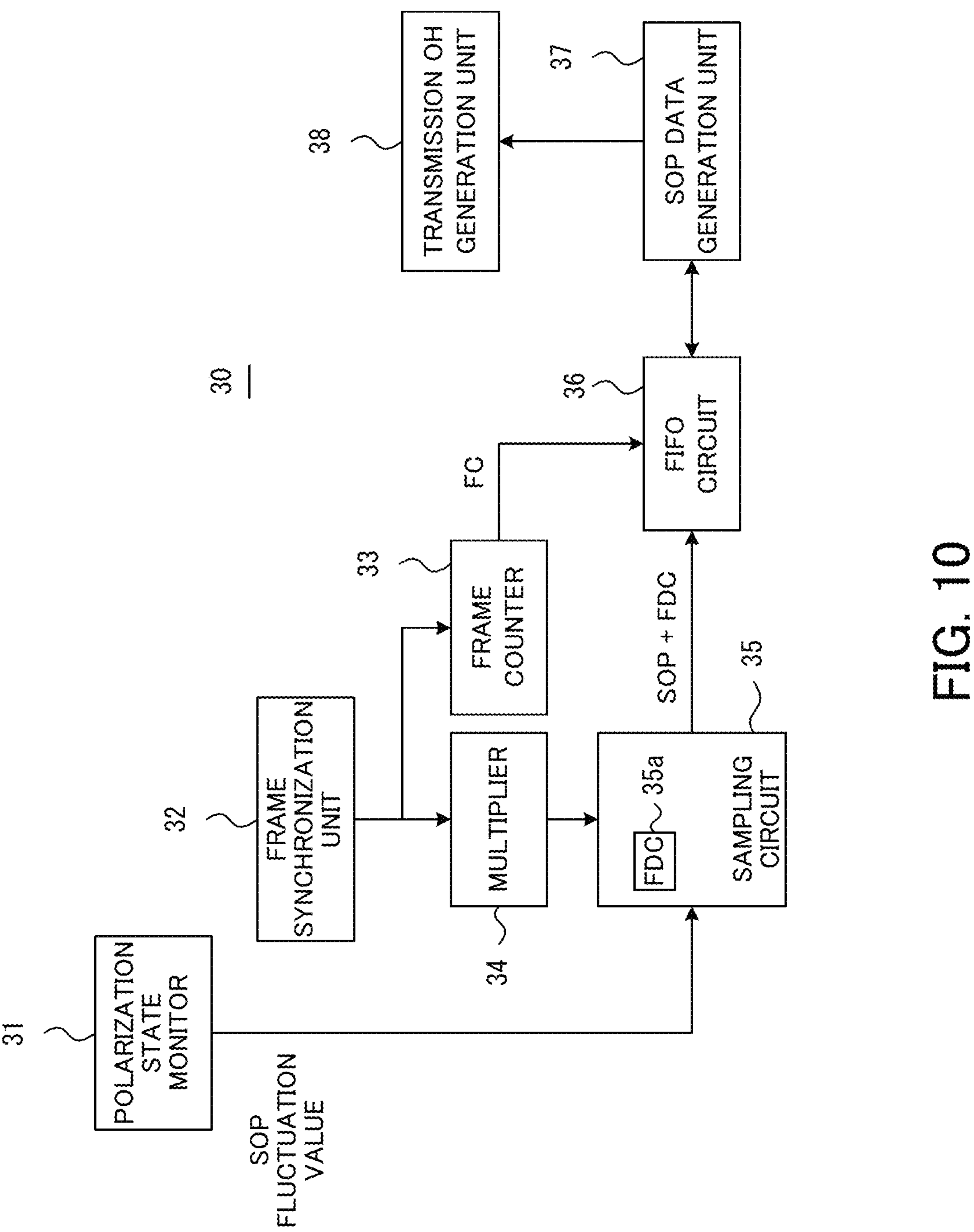
FIG. 10 illustrates an example of a functional configuration of a correspondent node device.

FIG. 10 illustrates an example of a method of generating the correspondent node SOP data in the correspondent node. In this example, the correspondent node device 30 provided in the correspondent node includes a polarization state monitor 31, a frame synchronization unit 32, a frame counter 33, a multiplier 34, a sampling circuit 35, a FIFO circuit 36, an SOP data generation unit 37, and a transmission OH generation unit 38. Note that the correspondent node device 30 may include other circuits, devices, or functions not illustrated in FIG. 10. Further, the correspondent node device 30 is implemented in an optical transmission device such as a transponder, for example. The transponder may include an optical transmitter, an optical receiver, and a digital signal processor (DSP).

The polarization state monitor 31 monitors the state of polarization of the optical transmission line based on the received optical signal. Note that the polarization state monitor 31 monitors the state of polarization of the optical transmission line based on, for example, the output signal of the adaptive equalizer 23 illustrated in FIG. 3 or the tap coefficients of the digital filter included in the adaptive equalizer 23. Then, the polarization state monitor 31 calculates the change in the polarization state at specified time intervals to output the SOP fluctuation value. The SOP fluctuation value corresponds to a polarization fluctuation speed (or polarization fluctuation level) representing a fluctuation speed of polarization.

The frame synchronization unit 32 generates a frame pulse at a specified frame cycle. Note that the frame cycle represents a transmission cycle of a frame transmitted via the optical transmission line 2.

The frame counter 33 outputs a counter value incremented according to the frame pulse. In the following description, the counter value output from the frame counter 33 may be referred to as "FC".

The multiplier 34 generates a 16-fold frame pulse having a frequency 16 times that of the frame pulse based on the frame pulse.

The sampling circuit 35 includes a frame decimal counter 35*a*. The frame decimal counter 35*a* outputs a counter value incremented according to the 16-fold frame pulse. Here, the frame decimal counter 35*a* cyclically outputs a value of 0 to 15. Note that, in the following description, the counter value output from the frame decimal counter 35*a* may be referred to as "FDC".

Further, the sampling circuit 35 samples the SOP fluctuation value according to the 16-fold frame pulse. Then, the sampling circuit 35 adds the counter value FDC to the sampled SOP fluctuation value and outputs the same.

The FIFO circuit 36 sequentially stores the SOP fluctuation value output from the polarization state monitor 31. At this time, each SOP fluctuation value is stored in association with the counter value FC output from the frame counter 33 and the counter value FDC output from the frame decimal counter 35*a*. Note that a pair of the counter value FC and the counter value FDC is used as time information indicating time.

The SOP data generation unit 37 generates correspondent node SOP data by reading the SOP fluctuation value, the counter value FC, and the counter value FDC from the FIFO circuit 36 in a frame cycle. Therefore, the correspondent node SOP data generated with the frame cycle includes one set of SOP fluctuation values (in this example, 16 SOP fluctuation values) as illustrated in FIG. 11A. In addition, a corresponding counter value FC and counter value FDC are given to each SOP fluctuation value. The counter value FC and the counter value FDC substantially represent the time when the SOP fluctuation value is detected.

Note that, in the correspondent node SOP data illustrated in FIG. 11A, the counter values FC given to the 16 SOP fluctuation values are the same. In addition, the counter value FDC cyclically represents a value of 0 to 15. Therefore, if the counter value FC and the counter value FDC given to one value (for example, SOP_1) among the 16 SOP fluctuation values are known, the counter value FC and the counter value FDC given to the other 15 SOP fluctuation values are uniquely determined. Therefore, as illustrated in FIG. 11B, the correspondent node SOP data corresponding to one transmission frame may be configured of 16 SOP fluctuation values, one counter value FC, and one counter value FDC.

The transmission OH generation unit 38 generates the overhead of the transmission frame. At this time, the transmission OH generation unit 38 inserts the correspondent node SOP data generated by the SOP data generation unit 37 into a specified region in the overhead. Note that, by using the correspondent node SOP data illustrated in FIG. 11B, the amount of information of data inserted into the overhead of the transmission frame can be reduced.

The correspondent node device 30 transmits a frame to the optical transmission line monitoring device via the optical transmission line 2 in the above-described frame cycle. At this time, the correspondent node SOP data illustrated in FIG. 11A or 11B is inserted into the overhead of each frame. Therefore, the optical transmission line monitoring device can acquire the correspondent node SOP data representing the state of the polarization detected in the correspondent node.

Figure 12:
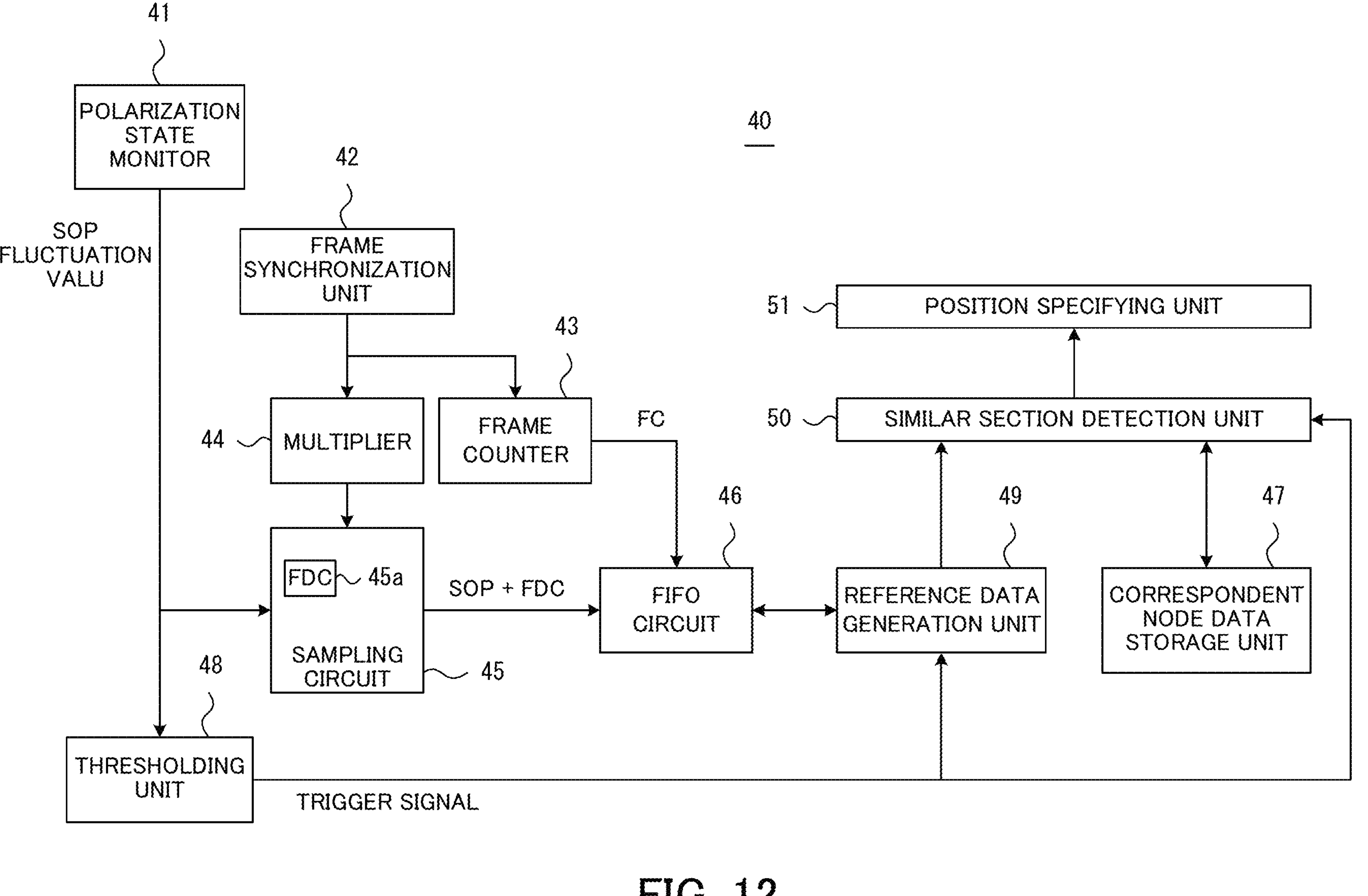
FIG. 12 illustrates an example of a functional configuration of an optical transmission line monitoring device.

FIG. 12 illustrates an example of a functional configuration of the optical transmission line monitoring device according to the embodiment. In this embodiment, the optical transmission line monitoring device 40 includes a polarization state monitor 41, a frame synchronization unit 42, a frame counter 43, a multiplier 44, a sampling circuit 45, a FIFO circuit 46, a correspondent node data storage unit 47, a thresholding unit 48, a reference data generation unit 49, a similar section detection unit 50, and a position specifying unit 51. Note that the optical transmission line monitoring device 40 may include other circuits, devices, or functions not illustrated in FIG. 12. Further, the optical transmission line monitoring device 40 is implemented in an optical transmission device such as a transponder, for example.

The functions of the polarization state monitor 41, the frame synchronization unit 42, the frame counter 43, the multiplier 44, the sampling circuit 45, and the FIFO circuit 46 are substantially the same as the functions of the polarization state monitor 31, the frame synchronization unit 32, the frame counter 33, the multiplier 34, the sampling circuit 35, and the FIFO circuit 36 illustrated in FIG. 10, respectively. Therefore, in the FIFO circuit 46, the local node SOP fluctuation value detected by the optical transmission line monitoring device 40 is stored in time series.

The correspondent node data storage unit 47 sequentially stores correspondent node SOP fluctuation values detected in the correspondent node. Here, as described with reference to FIG. 10, the correspondent node device 30 generates the correspondent node SOP data illustrated in FIG. 11A or 11B for each frame cycle. Further, the correspondent node device 30 inserts the correspondent node SOP data into the overhead of each frame and transmits the correspondent node SOP data to the optical transmission line monitoring device 40. Then, the optical transmission line monitoring device 40 extracts the correspondent node SOP data from each received frame and sequentially stores the correspondent node SOP data in the correspondent node data storage unit 47.

Figure 13:
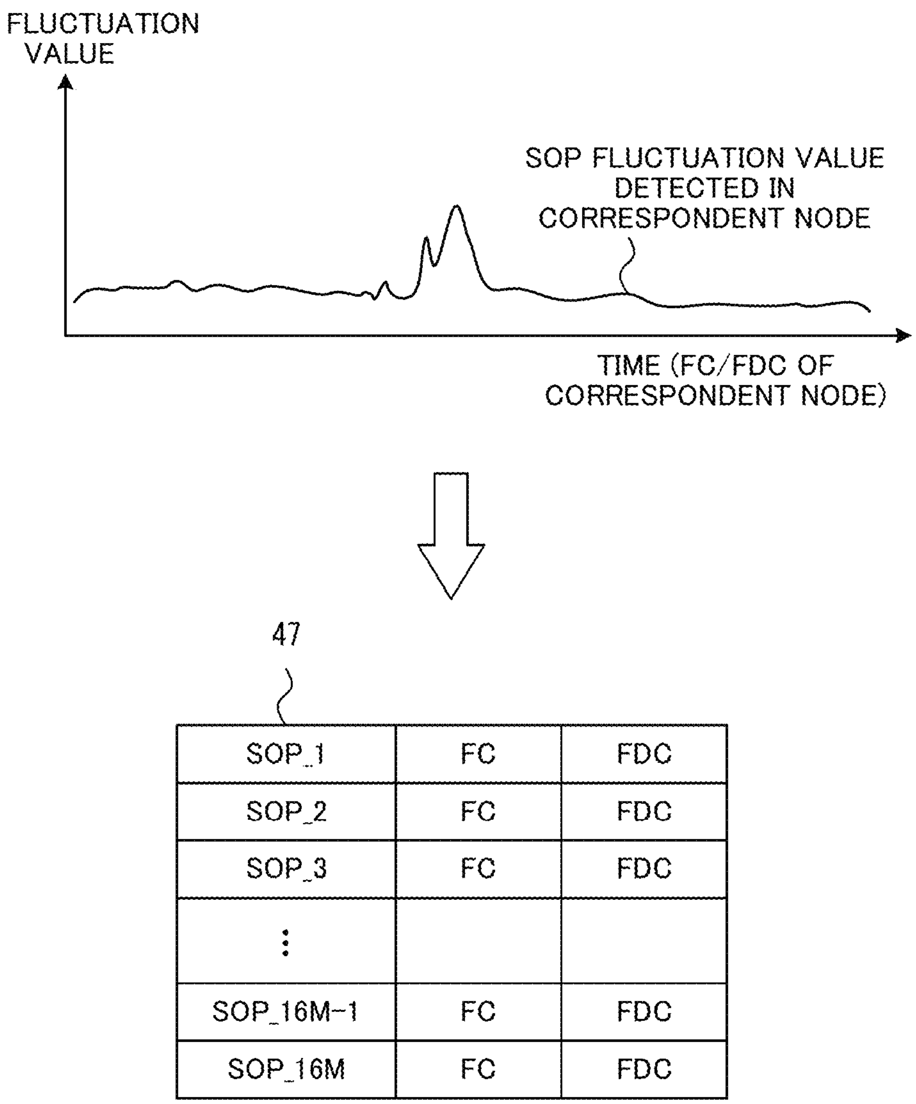
FIG. 13 illustrates an example of the correspondent node SOP data stored in the correspondent node data storage unit.

The correspondent node data storage unit 47 is a FIFO memory in this embodiment. In this case, the correspondent node data storage unit 47 stores, for example, the latest 16M correspondent node SOP fluctuation values. M represents the number of frames present on the optical transmission line when a frame is bidirectionally transmitted at a specified cycle between the optical transmission line monitoring device 40 and the correspondent node. That is, M is obtained by dividing a round-trip time (RTT) between the optical transmission line monitoring device 40 and the correspondent node by the transmission cycle of the frame. Here, 16 correspondent node SOP fluctuation values are inserted into the overhead of each frame. Therefore, as illustrated in FIG. 13, the correspondent node SOP fluctuation values extracted from the latest M received frames are stored in the correspondent node data storage unit 47.

Preferably, the optical transmission line monitoring device 40 measures the RTT between the optical transmission line monitoring device 40 and the correspondent node in advance. A method of measuring the RTT is not particularly limited, but in a case in which an optical transmission system transmits an optical transport network (OTN) frame, a delay measurement function of the OTN can be used.

The thresholding unit 48 compares the local node SOP fluctuation value detected by the polarization state monitor 41 with a specified threshold level. Then, when the local node SOP fluctuation value exceeds the threshold level, the thresholding unit 48 outputs a trigger signal. That is, when the optical transmission line monitoring device 40 detects the polarization fluctuation larger than the specified threshold level, the trigger signal is output from the thresholding unit 48.

Figure 14:
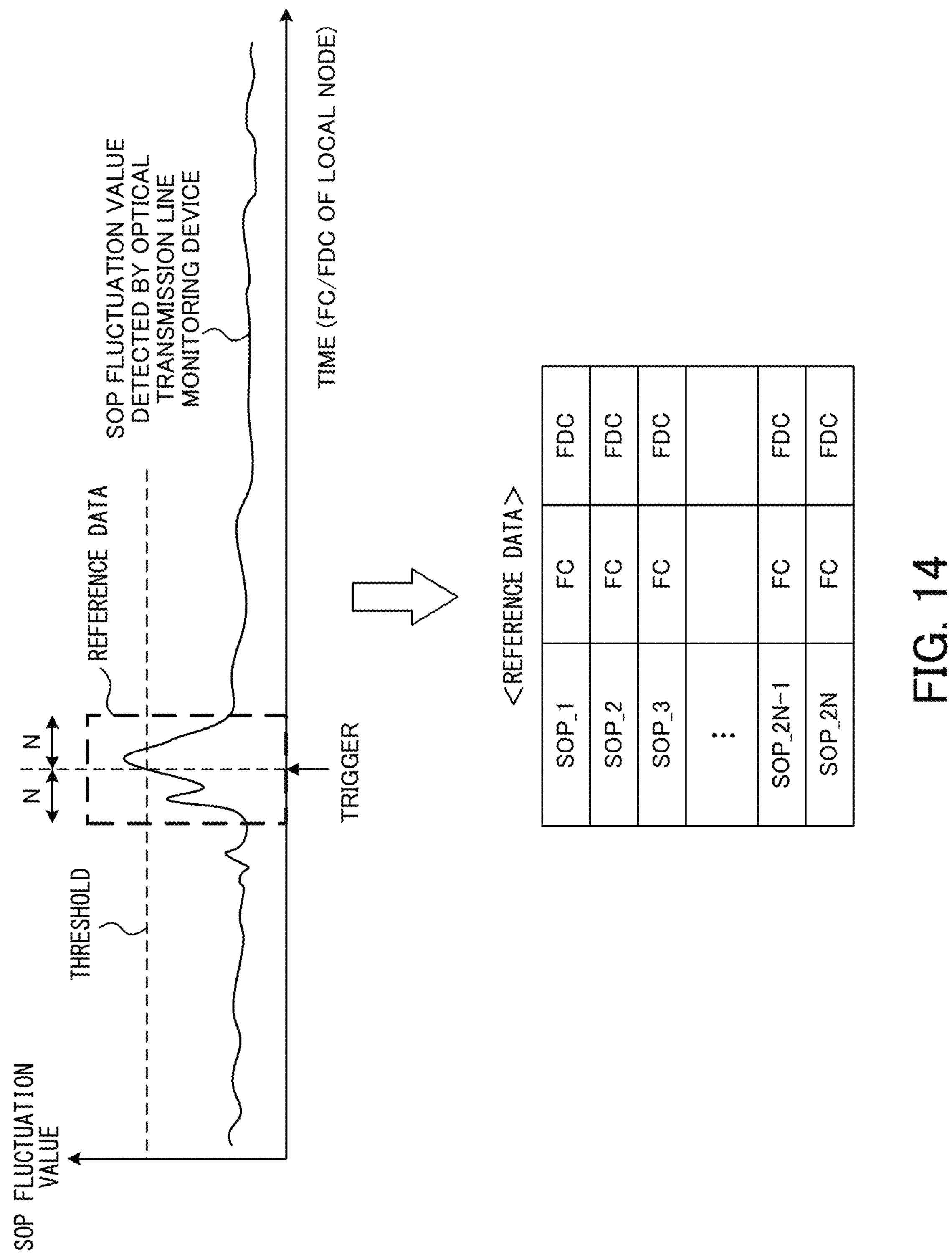
FIG. 14 illustrates an example of a method of generating reference data.

Upon receiving the trigger signal, as illustrated in FIG. 14, the reference data generation unit 49 reads the local node SOP fluctuation value detected in a specified period near the trigger signal from the FIFO circuit 46 to generate reference data. Here, the range in which the local node SOP fluctuation value is read from the FIFO circuit 46 to generate the reference data is preferably determined so as to include a period in which the polarization greatly fluctuates due to a specific cause in the optical transmission line 2. For example, the period during which the polarization fluctuation occurs due to the lightning strike is several 10 μs. Therefore, in this case, for example, if the local node SOP fluctuation value detected in 100 μs immediately before and immediately after the time at which the trigger signal is output (that is, the time at which the optical transmission line monitoring device 40 detects the local node SOP fluctuation value larger than the threshold level) is acquired, the waveform (reference SOP waveform) of the polarization fluctuation caused by the lightning strike or the like can be obtained.

Note that the range in which the local node SOP fluctuation value is read from the FIFO circuit 46 to generate the reference data is determined based on the transmission cycle the frame in this embodiment. Specifically, N illustrated in FIG. 14 is represented by a value converted into a cycle of the frame decimal counter 45*a*. The cycle of the frame decimal counter 45*a* is 1/16 of the transmission cycle of the frame. Therefore, for example, when "100 μs" is converted into the cycle of the frame decimal counter 45*a*, N is 160. In this case, the reference data is configured of 320 local node SOP fluctuation values near the trigger signal. That is, the reference SOP waveform is represented by 320 local node SOP fluctuation values near the trigger signal.

The similar section detection unit 50 searches for a section having a polarization state similar to the polarization state represented by the reference data (that is, the reference SOP waveform) in the correspondent node SOP data representing the state of the polarization detected by the correspondent node, thereby detecting the time at which the polarization fluctuation generated in the optical transmission line 2 arrives at the correspondent node. Here, the correspondent node SOP data is stored in the correspondent node data storage unit 47.

Figure 15:
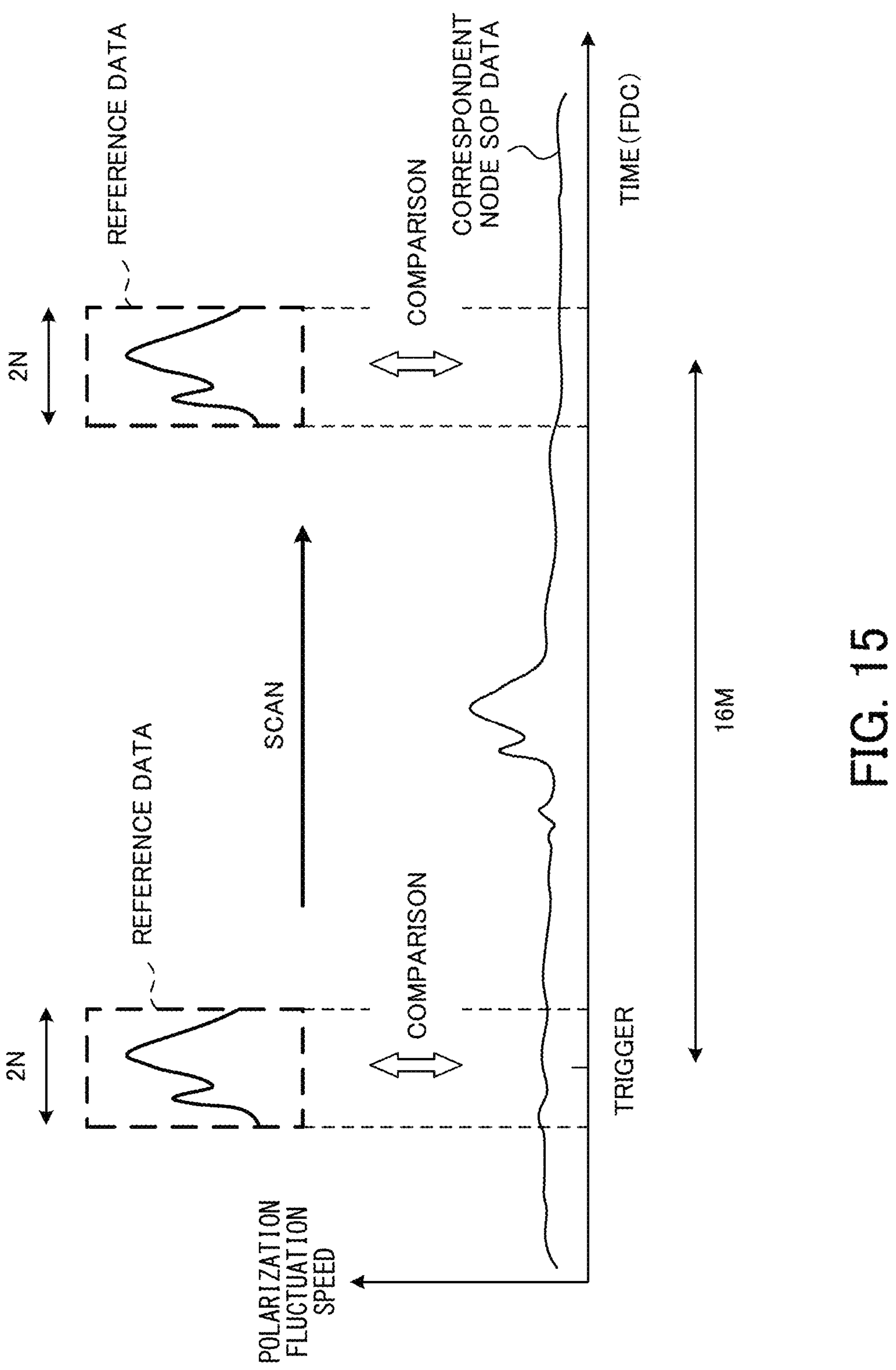
FIG. 15 illustrates an outline of a process of a similar section detection unit.

FIG. 15 illustrates an outline of a process of the similar section detection unit 50. The similar section detection unit 50 searches for a section having a waveform similar to the waveform of the reference data in the correspondent node SOP data. The similar section detection unit 50 searches for a section similar to the reference data while shifting the reference data with respect to the correspondent node SOP data. The search is started when a trigger signal is generated (that is, when the optical transmission line monitoring device 40 detects a local node SOP fluctuation value larger than the threshold level). The search period is "16M" when converted into the cycle of the frame decimal counter 45*a*.

Figure 16:
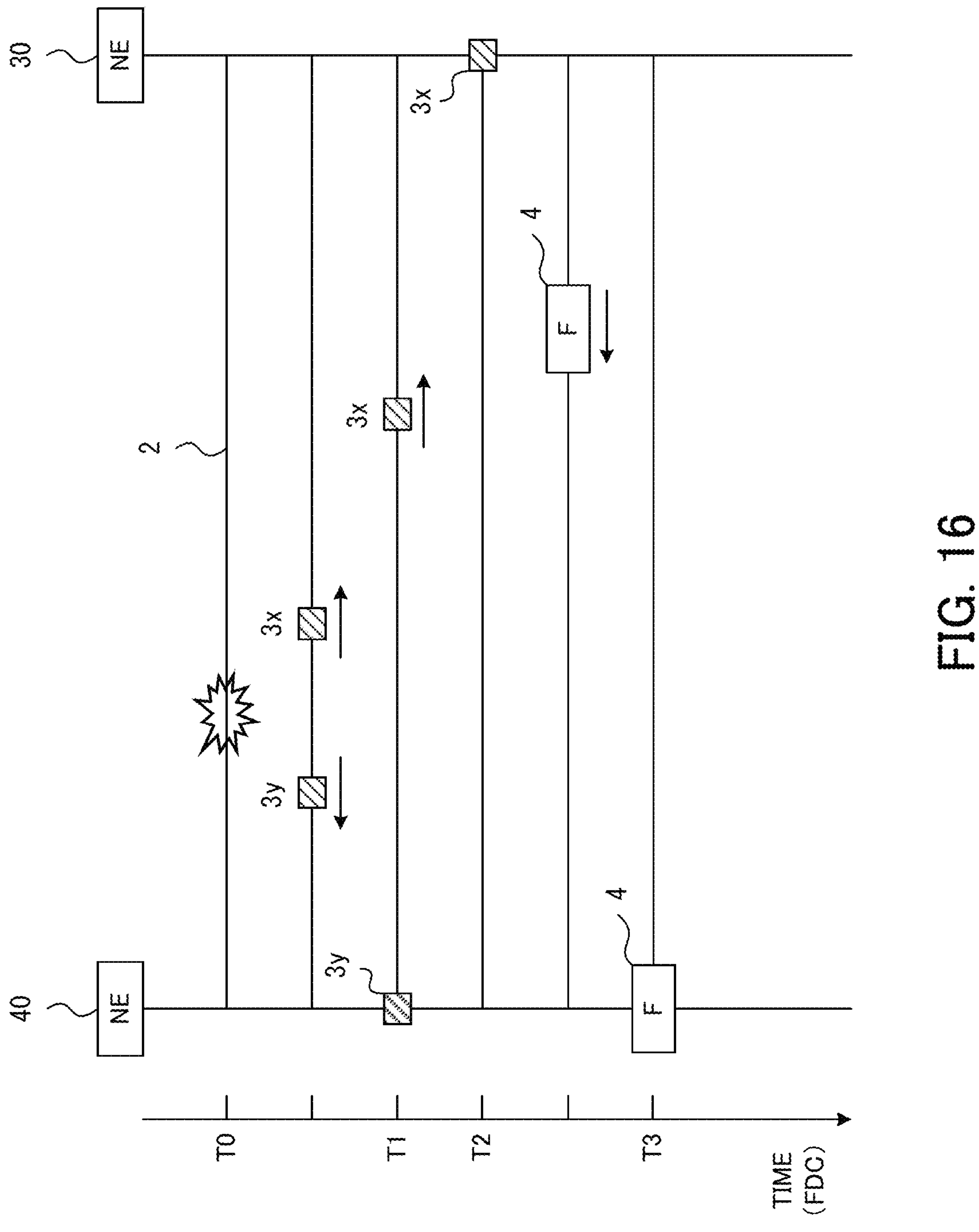
FIG. 16 is a diagram illustrating a search period performed by the similar section detection unit.

FIG. 16 is a diagram illustrating a search period used by the similar section detection unit 50. In this case, polarization fluctuation occurs at time T0. Thereafter, the polarization fluctuation component 3*x* propagates toward the correspondent node device 30, and the polarization fluctuation component 3*y* propagates toward the optical transmission line monitoring device 40. At time T1, the polarization fluctuation component 3*y* arrives at the optical transmission line monitoring device 40. At this time, the optical transmission line monitoring device 40 detects that the polarization fluctuation occurs. Subsequently, at time T2, the polarization fluctuation component 3*x* arrives at the correspondent node device 30.

The correspondent node device 30 constantly monitors the state of polarization of the optical transmission line 2 as described with reference to FIGS. 10, 11A, and 11B. Further, the correspondent node device 30 transmits a frame to the optical transmission line monitoring device 40 at a specified cycle. At this time, the correspondent node SOP data illustrated in FIG. 11A or 11B is inserted into the overhead of each frame. Here, the correspondent node SOP data generated when the polarization fluctuation component 3*x* arrives at the correspondent node device 30 is inserted into the frame 4 illustrated in FIG. 16. The frame 4 propagates from the correspondent node device 30 toward the optical transmission line monitoring device 40. Then, the optical transmission line monitoring device 40 receives the frame 4 at time T3. Note that the processing time for the correspondent node device 30 to generate and transmit a frame is assumed to be sufficiently short.

Here, the period from the time (T0) at which the polarization fluctuation occurs in the optical transmission line 2 to the time (T3) at which the optical transmission line monitoring device 40 receives the frame 4 is not longer than the RTT between the optical transmission line monitoring device 40 and the correspondent node device 30. Thus, the period from the time (T1) at which the optical transmission line monitoring device 40 detects the polarization fluctuation to the time (T3) at which the optical transmission line monitoring device 40 receives the frame 4 is shorter than the RTT between the optical transmission line monitoring device 40 and the correspondent node device 30. Therefore, the correspondent node SOP data when the polarization fluctuation component 3*x* arrives at the correspondent node device 30 reaches the optical transmission line monitoring device 40 within the period from the time when the trigger signal is generated (that is, the time when the optical transmission line monitoring device 40 detected the polarization fluctuation) until the RTT elapses. That is, the correspondent node SOP data detected when the polarization fluctuation component 3*x* arrives at the correspondent node device 30 should be included in the correspondent node SOP data from the time when the trigger signal is generated until the time corresponding to the RTT elapses.

Based on such a reason, the RTT between the optical transmission line monitoring device 40 and the correspondent node device 30 is set as a period during which the similar section detection unit 50 searches the correspondent node SOP data. Note that the RTT is "M" when converted into the frame period, and is "16M" when converted into the period of the frame decimal counter 45*a*.

FIG. 17 illustrates an example of a process of the similar section detection unit 50. The similar section detection unit 50 calculates a correlation between the reference data and the correspondent node SOP data. Here, the reference data is configured of 2N local node SOP fluctuation values. Therefore, the similar section detection unit 50 calculates a difference between the 2N local node SOP fluctuation values constituting the reference data and the 2N correspondent node SOP fluctuation values in the correspondent node SOP data. At this time, the similar section detection unit 50 calculates a difference between the reference data and the correspondent node SOP data while shifting the reference data by one entry with respect to the correspondent node SOP data. Then, a section having the smallest difference is specified.

Figure 18:
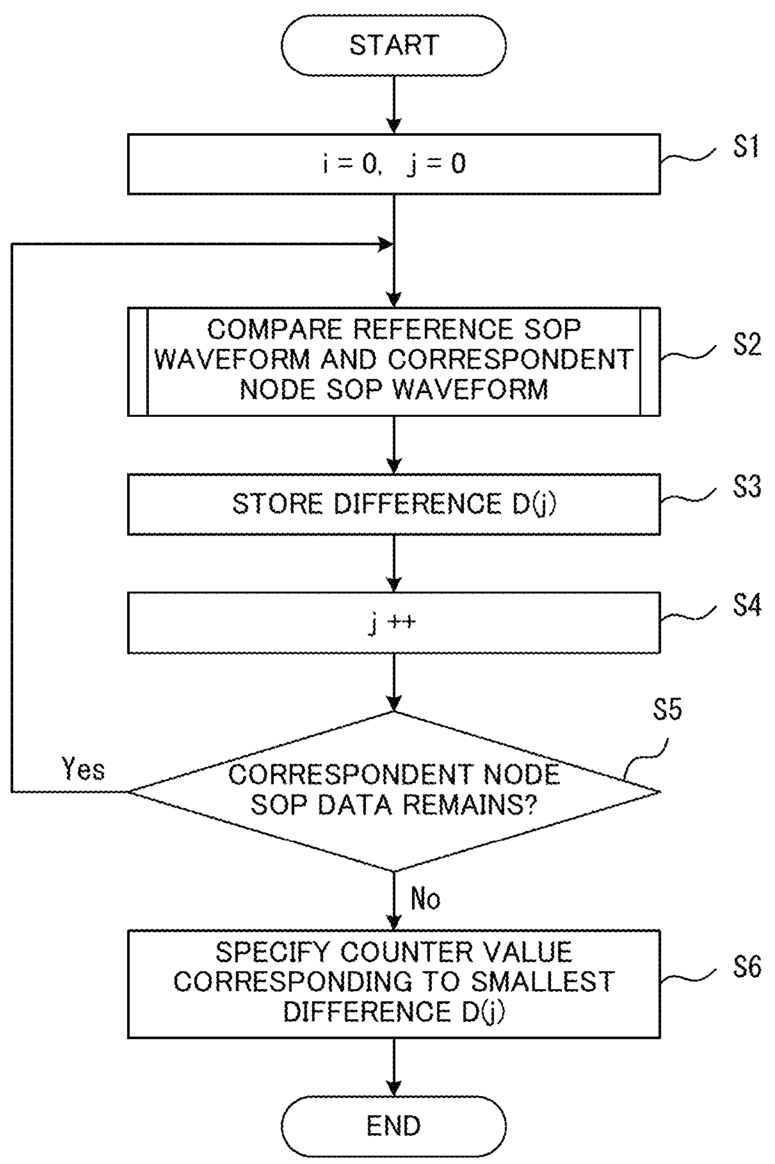
FIG. 18 is a flowchart illustrating an example of a process of the similar section detection unit.

FIG. 18 is a flowchart illustrating an example of a process of the similar section detection unit 50. Note that the reference data and the correspondent node SOP data illustrated in FIG. 17 are given to the similar section detection unit 50. The reference data is configured of 2N entries. In each entry of the reference data, the local node SOP fluctuation value detected by the optical transmission line monitoring device 40 and a counter value (FC and FDC) representing a detection time thereof are recorded. The correspondent node SOP data is configured of 16M entries. In each entry of the correspondent node SOP data, the correspondent node SOP fluctuation value detected by the correspondent node device 30 and a counter value (FC and FDC) representing a detection time thereof are recorded. In the following description, the local node SOP fluctuation value constituting the reference data may be referred to as a "reference SOP fluctuation value". Further, the SOP fluctuation value constituting the correspondent node SOP data may be referred to as "correspondent node SOP fluctuation value".

In S1, the similar section detection unit 50 initializes each of the variable i and the variable j. The variable i identifies an entry constituting the reference data, and "i=1" represents a head entry of the reference data. The variable j identifies an entry constituting the correspondent node SOP data, and "j=1" represents a head entry of the correspondent node SOP data.

In S2, the similar section detection unit 50 compares the reference SOP waveform with the correspondent node SOP waveform. The reference SOP waveform is represented by 2N reference SOP fluctuation values. Further, the correspondent node SOP waveform is represented by 2N correspondent node SOP fluctuation values extracted from 16M correspondent node SOP fluctuation values. The 2N correspondent node SOP fluctuation values are extracted based on the variable j. Then, the similar section detection unit 50 calculates a difference value d representing the similarity between the reference SOP waveform and the correspondent node SOP waveform. In S3, the calculated difference value d is stored as a difference value D(j) corresponding to the variable j.

In S4, the similar section detection unit 50 increments the variable j. As a result, the section to be compared with the reference data is shifted. In S5, the similar section detection unit 50 determines whether correspondent node SOP data to be compared with the reference data remains. Here, the reference data is configured of 2N entries, and the correspondent node SOP data is configured of 16M entries. Therefore, when the variable j is smaller than "16M−2N+1", it is determined that correspondent node SOP data to be compared with the reference data remains.

When correspondent node SOP data to be compared with the reference data remains, the process of the similar section detection unit 50 returns to S2. That is, the process of S2 to S4 is repeatedly executed while shifting the section to be compared with the reference data. At this time, a difference value D(j) is calculated for each section on the correspondent node SOP data. Then, when the comparison with the reference data for the entire correspondent node SOP data ends, the process of the similar section detection unit 50 proceeds to S6.

In S6, the similar section detection unit 50 specifies the minimum difference value in the difference values D(j) calculated for the respective sections. Then, the similar section detection unit 50 refers to the correspondent node SOP data and specifies counter values (FC and FDC) corresponding to the minimum difference value D. Note that the counter value specified by the procedure illustrated in FIG. 18 represents the time when the polarization fluctuation generated in the optical transmission line 2 arrives at the correspondent node.

Figure 19:
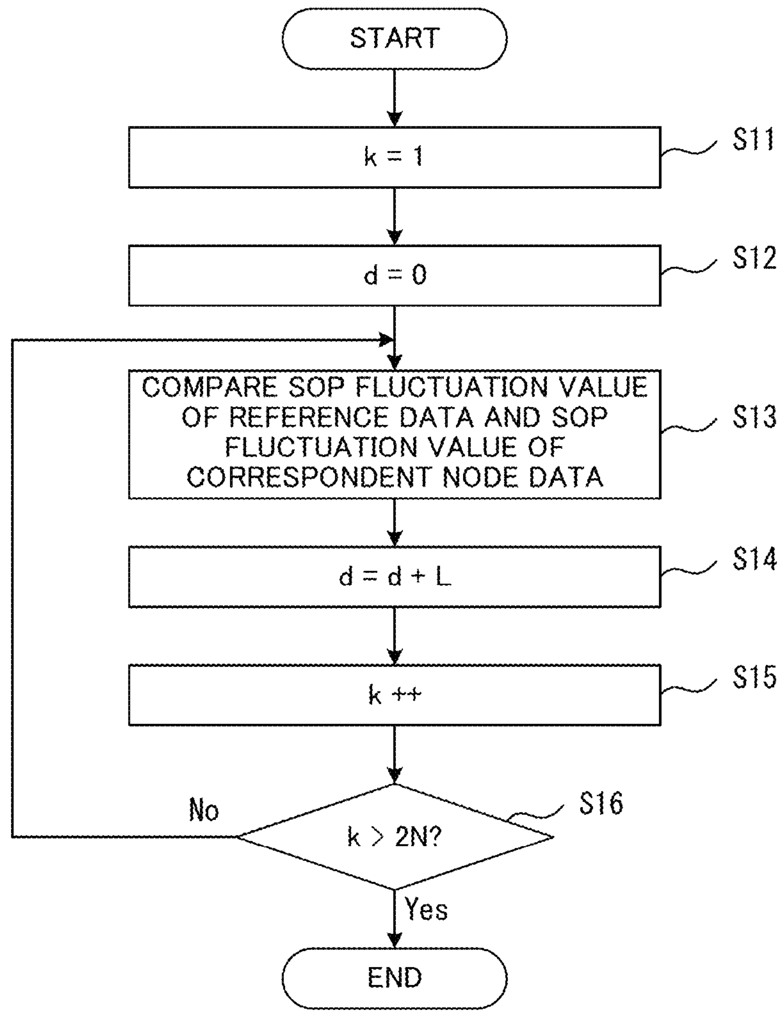
FIG. 19 is a flowchart illustrating an example of a process of comparing a reference SOP waveform with a correspondent node SOP waveform.

FIG. 19 is a flowchart illustrating an example of a process of comparing a reference SOP waveform with a correspondent node SOP waveform. The process of this flowchart corresponds to S2 illustrated in FIG. 18.

In S11, the similar section detection unit 50 initializes the variable k to "1". The variable k specifies an entry to be subjected to the comparison process. In S12, the similar section detection unit 50 initializes the variable d to "0". The variable d represents a calculated value of the comparison process between the reference SOP fluctuation value and the correspondent node SOP fluctuation value.

In S13, the similar section detection unit 50 compares the reference SOP fluctuation value with the correspondent node SOP fluctuation value for the entry designated by the variable k. For example, when "k=5", the the fifth reference SOP comparison process between SOP fluctuation value and the fifth correspondent node fluctuation value is executed. The comparison process is realized by, for example, Formula (3). That is, the absolute value of the difference between the k-th reference SOP fluctuation value and the k-th correspondent node SOP fluctuation value is calculated. SOP_local (k) represents a k-th reference SOP fluctuation value in the reference data, and SOP_remote (k) represents a k-th correspondent node SOP fluctuation value in the correspondent node SOP data to be compared with the reference data.

$$L = |\mathrm{SOP\_local}(k) - \mathrm{SOP\_remote}(k)| \tag{3}$$

Formula (3) is an example of the comparison process, and the embodiment of the present disclosure is not limited to this method. That is, the absolute value of the difference between the square of the k-th reference SOP fluctuation value and the square of the k-th correspondent node SOP fluctuation value may be calculated.

In S14, the similar section detection unit 50 adds a calculation result L in S13 to the variable d. Subsequently, in S15, the similar section detection unit 50 increments the variable k. Then, in S16, the similar section detection unit 50 determines whether SOP fluctuation values to be compared are left. Here, the reference data is configured of 2N entries. Therefore, when the variable k is 2N or less, it is determined that the SOP fluctuation value to be compared are left.

When the SOP fluctuation value to be compared remains, the process of the similar section detection unit 50 returns to S13. That is, the process of S13 to S15 is repeatedly executed on the next SOP fluctuation value. At this time, a new calculation result L is added to the current value of the variable d. That is, the calculation result L for each SOP fluctuation value is cumulatively added. Then, when the comparison process is executed on all the SOP fluctuation values, the process of the similar section detection unit 50 ends.

In this manner, the similar section detection unit 50 searches for a section in which a waveform similar to the reference SOP waveform appears in the correspondent node SOP data. As a result, the time at which the polarization fluctuation generated in the optical transmission line 2 arrives at the correspondent node is detected.

The position specifying unit 51 specifies the polarization fluctuation position based on the time when the optical transmission line monitoring device 40 detects the polarization fluctuation and the time when the polarization fluctuation arrives at the correspondent node. The time when the optical transmission line monitoring device 40 detects the polarization fluctuation is detected by the thresholding unit 48 illustrated in FIG. 12. The time when the polarization fluctuation arrives at the correspondent node is detected by the similar section detection unit 50.

Figure 20:
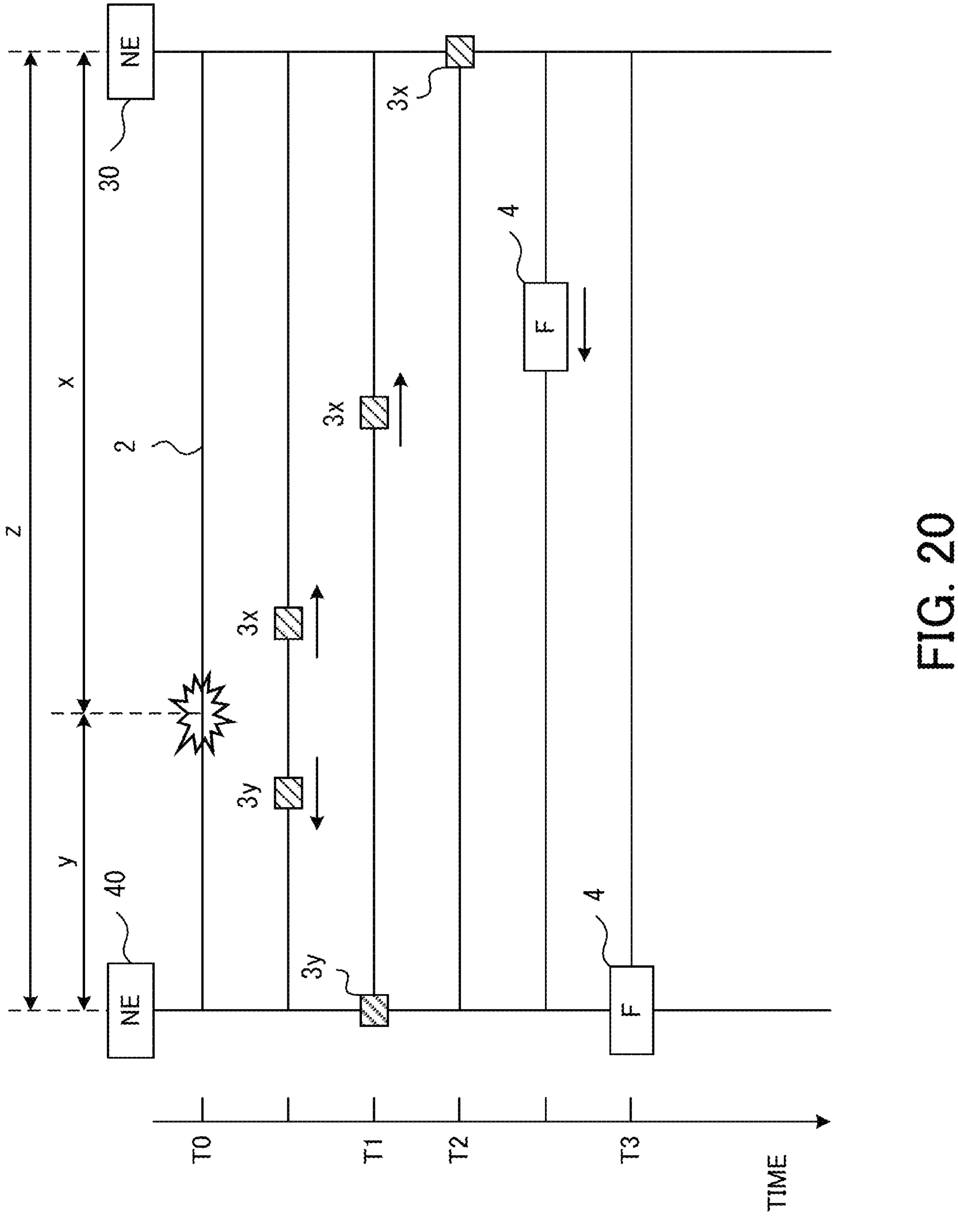
FIG. 20 illustrates an example of a method of specifying a polarization fluctuation position.

FIG. 20 illustrates an example of a method of specifying a polarization fluctuation position. In FIG. 20, z represents a time during which light propagates from the optical transmission line monitoring device 40 to the correspondent node device 30 via the optical transmission line 2. y represents a time during which light propagates from the polarization fluctuation position to the optical transmission line monitoring device 40 via the optical transmission line 2. x represents a time during which light propagates from the polarization fluctuation position to the correspondent node device 30 via the optical transmission line 2. Thus, x+y=z is obtained.

In this case, it is assumed that polarization fluctuation occurs at time T0. Then, the polarization fluctuation component 3*x* propagates toward the correspondent node device 30, and the polarization fluctuation component 3*y* propagates toward the optical transmission line monitoring device 40. Then, at time T1, the polarization fluctuation component 3*y* arrives at the optical transmission line monitoring device 40. At this time, the optical transmission line monitoring device 40 detects that the polarization fluctuation occurs. That is, the trigger signal is output from the thresholding unit 48. Further, at time T2, the polarization fluctuation component 3*x* arrives at the correspondent node device 30.

The correspondent node device 30 constantly monitors the state of polarization of the optical transmission line 2 as described with reference to FIGS. 10, 11A, and 11B. Further, the correspondent node device 30 transmits a frame to the optical transmission line monitoring device 40 at a specified cycle. At this time, the correspondent node SOP data illustrated in FIG. 11A or 11B is inserted into the overhead of each frame. Here, the correspondent node SOP data generated by the correspondent node device 30 when the polarization fluctuation component 3*x* arrives at the correspondent node is inserted into the frame 4 illustrated in FIG. 20. The frame 4 propagates from the correspondent node device 30 toward the optical transmission line monitoring device 40. Then, the optical transmission line monitoring device 40 receives the frame 4 at time T3. Note that the process for the correspondent node device 30 to generate and transmit a frame is performed by a hardware circuit such as an FPGA in this embodiment. Therefore, the process time for the correspondent node device 30 to generate and transmit a frame is assumed to be sufficiently short.

In the above sequence, the time T1 at which the optical transmission line monitoring device 40 detects the polarization fluctuation generated in the optical transmission line 2 is expressed by Formula (4).

$$T1 = T0 + y \tag{4}$$

A time T2 at which the polarization fluctuation component 3*x* caused by the polarization fluctuation detected by the optical transmission line monitoring device 40 arrives at the correspondent node is expressed by Formula (5).

$$T2 = T0 + x \tag{5}$$

When the processing time for the correspondent node device 30 to generate and transmit a frame is neglected, the time T3 at which the optical transmission line monitoring device 40 receives the frame 4 is expressed by Formula (6).

$$T3 = T2 + z = T0 + x + z \tag{6}$$

When "y" is removed from Formulas (4) and (6) using "x+y=2", Formula (7) is obtained.

$$T3 - T1 = 2x \quad (7)$$

$$\therefore x = \frac{T3 - T1}{2}$$

As described above, the time x during which the light propagates from the polarization fluctuation position to the correspondent node via the optical transmission line 2 is obtained by dividing the difference between the time T1 and the time T3 by 2. T1 is a time at which the optical transmission line monitoring device 40 detects the polarization fluctuation larger than the threshold level. Further, T3 is the time when the polarization fluctuation component caused by the polarization fluctuation arrives at the correspondent node, and is specified by the similar section detection unit 50. Therefore, the optical transmission line monitoring device 40 can calculate the distance from the correspondent node to the polarization fluctuation position based on the propagation time x. That is, the polarization fluctuation position on the optical transmission line is specified.

Note that the optical transmission line monitoring device 40 is implemented by, for example, an arithmetic device such as a digital signal processor (DSP) and a hardware circuit such as a field programmable gate array (FPGA). In this case, although not particularly limited, for example, the polarization state monitor 41, the similar section detection unit 50, and the position specifying unit 51 may be implemented by a DSP. The frame synchronization unit 42, the frame counter 43, the multiplier 44, the sampling circuit 45, the FIFO circuit 46, the correspondent node data storage unit 47, the thresholding unit 48, and the reference data generation unit 49 may be implemented by an FPGA.

As described above, in the optical transmission line monitoring method according to the embodiment of the present disclosure, by comparing the waveform of the polarization fluctuation detected in the local node with the waveform of the polarization fluctuation detected in the correspondent node, the optical transmission line monitoring device can detect the timing at which the polarization fluctuation component caused by the polarization fluctuation arrives at the correspondent node. Therefore, even when the polarization fluctuation component arriving at the correspondent node is smaller than the specified threshold level, the polarization fluctuation position can be specified.

In addition, in an optical transmission system in which a frame is transmitted in a specified cycle, if the polarization fluctuation position is specified based on the transmission cycle of the frame, there is a possibility that accuracy is lowered. For example, when the frame cycle is 10 μs, the error of the polarization fluctuation position is 2 km at the maximum. On the other hand, in the embodiment of the present disclosure, the sampling speed with respect to the SOP fluctuation value is increased by increasing the speed of the frame pulse signal using the multiplier. As a result, the accuracy or granularity for the detection time of the polarization fluctuation is enhanced, and the accuracy or granularity of the specified polarization fluctuation position is enhanced. In the above-described embodiment, the error of the polarization fluctuation position is improved to 1/16.

Variations

In the above-described embodiment, as illustrated in FIGS. 10 and 12, the speed-up of the frame pulse is realized using the multiplier and the frame decimal counter. However, in a case where the transmission cycle of the frame is sufficiently short, the optical transmission line monitoring device 40 (and the correspondent node device 30) does not need to include the multiplier and the frame decimal counter.

In the above-described embodiment, the SOP fluctuation value detected by the correspondent node device 30 is inserted into the overhead of the transmission frame, but the embodiment of the present disclosure is not limited to this configuration. For example, the SOP fluctuation value may be inserted into the payload of each frame.

In the above-described embodiment, the optical transmission line monitoring device 40 is implemented in an optical transmission device provided at a terminal node of the optical transmission line 2, but the embodiment of the present disclosure is not limited to this configuration. For example, a server computer connected to the optical transmission system may collect the polarization state data from the optical transmission devices provided at both ends of the optical transmission line 2 and specify the polarization fluctuation position from the collected polarization state data.

In the above-described embodiment, the counter included in the optical transmission line monitoring device 40 and the counter included in the correspondent node device 30 operate independently of each other, but the embodiment of the present disclosure is not limited to this configuration. That is, the counter included in the optical transmission line monitoring device 40 and the counter included in the correspondent node device 30 may be synchronized with each other. In this case, the correspondent node device 30 does not need to immediately transmit the detected polarization state data, and the polarization fluctuation position can be specified by comparing the polarization state data detected by the optical transmission line monitoring device 40 with the polarization state data detected by the correspondent node device 30.

In the above-described embodiment, the optical transmission line monitoring device 40 is provided at one terminal node of the optical transmission line 2, and the correspondent node device 30 is provided at the other terminal node. However, the embodiment of the present disclosure is not limited to this configuration. That is, the optical transmission line monitoring device 40 may be provided at both ends of the optical transmission line 2. In this case, the optical transmission line monitoring device 40 needs to have a function of transmitting the detected SOP polarization value to the correspondent node. According to this configuration, when the polarization fluctuation larger than the threshold level is detected in one of the terminal nodes, the polarization fluctuation position can be specified.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmission line monitoring device provided in a first terminal node of one set of terminal nodes in an optical transmission system that transmits a frame bidirectionally between the one set of terminal nodes via an optical transmission line, the optical transmission line monitoring device comprising:

a polarization state monitor that monitors a state of polarization of the optical transmission line;

a first storage unit that stores first polarization state data representing a state of polarization detected by the polarization state monitor;

a second storage unit that stores second polarization state data representing a state of polarization of the optical transmission line, the second polarization state data being detected by a correspondent node device provided in a second terminal node of the one set of terminal nodes; and a processor configured to detect a first time representing a time at which a polarization fluctuation component caused by polarization fluctuation generated in the optical transmission line arrives at the optical transmission line monitoring device by comparing a polarization fluctuation value representing a fluctuation speed of polarization detected by the polarization state monitor with a specified threshold level, generate reference data by extracting the first polarization state data near the first time from the first storage unit, detect a second time representing a time at which a polarization fluctuation component caused by the polarization fluctuation arrives at the correspondent node device by searching for a section having a polarization state similar to the polarization state represented by the reference data in the second polarization state data, and determine a polarization fluctuation position representing a position where the polarization fluctuation occurs based on the first time and the second time.

2. The optical transmission line monitoring device according to claim 1, wherein the first time represents a time at which the polarization fluctuation value detected by the polarization state monitor exceeds the specified threshold level.

3. The optical transmission line monitoring device according to claim 1, wherein the processor searches the second polarization state data for a section having a polarization state similar to the polarization state represented by the reference data in a time region corresponding to a round-trip time (RTT) between the optical transmission line monitoring device and the correspondent node device from the first time.

4. The optical transmission line monitoring device according to claim 1, wherein the first polarization state data includes a plurality of polarization fluctuation values detected at a specified time interval by the polarization state monitor, the second polarization state data includes a plurality of polarization fluctuation values detected at the specified time interval by the correspondent node device, the reference data is configured of 2N polarization fluctuation values including N polarization fluctuation values immediately before the first time and N polarization fluctuation values immediately after the first time in the first polarization state data, and the processor calculates a plurality of difference values by calculating a sum of differences between 2N polarization fluctuation values included in the reference data and corresponding 2N polarization fluctuation values in the second polarization state data while shifting a position of the reference data with respect to the second polarization state data, and the processor determines 2N polarization fluctuation values in the second polarization state data corresponding to a minimum difference value among the plurality of difference values to detect the second time representing a time at which a polarization fluctuation component caused by the polarization fluctuation arrives at the correspondent node device.

5. The optical transmission line monitoring device according to claim 1, wherein the processor calculates a propagation difference time by dividing a difference between the first time and the second time by two, and the processor determines that the polarization fluctuation occurs at a position where light has propagated from the correspondent node device through the optical transmission line by the propagation difference time.

6. An optical transmission line monitoring system that monitors an optical transmission line in an optical transmission system that bidirectionally transmits a frame in a specified frame cycle between a first terminal node and a second terminal node via the optical transmission line, the optical transmission line monitoring system comprising:

an optical transmission line monitoring device provided at the first terminal node; and a correspondent node device provided at the second terminal node, wherein the optical transmission line monitoring device includes:

a polarization state monitor that monitors state of polarization of the optical transmission line;

a first storage unit that stores first polarization state data representing a state of polarization detected by the polarization state monitor;

a second storage unit that stores second polarization state data representing a state of polarization of the optical transmission line, the second polarization state data being detected by the correspondent node device;

a processor configured to detect a first time representing a time at which a polarization fluctuation component caused by polarization fluctuation generated in the optical transmission line arrives at the optical transmission line monitoring device by comparing a polarization fluctuation value representing a fluctuation speed of polarization detected by the polarization state monitor with a specified threshold level, generate reference data by extracting the first polarization state data near the first time from the first storage unit, detect a second time representing a time at which a polarization fluctuation component caused by the polarization fluctuation arrives at the correspondent node device by searching for a section having a polarization state similar to the polarization state represented by the reference data in the second polarization state data, and determine a polarization fluctuation position representing a position where the polarization fluctuation occurs based on the first time and the second time, and the correspondent node device includes:

a second polarization state monitor that monitors a state of polarization of the optical transmission line;

a frame generation unit that generates a transmission frame including a polarization fluctuation value detected by the second polarization state monitor in the specified frame cycle; and a transmission unit that transmits the transmission frame to the optical transmission line monitoring device in the specified frame cycle.

7. The optical transmission line monitoring system according to claim 6, wherein the frame generation unit inserts a plurality of polarization fluctuation values detected by the second polarization state monitor into each transmission frame.

8. An optical transmission line monitoring method for monitoring an optical transmission line in an optical transmission system that bidirectionally transmits a frame between one set of terminal nodes via the optical transmission line, the method comprising:

monitoring a state of polarization of the optical transmission line in a first terminal node of the one set of terminal nodes;

storing first polarization state data representing a state of polarization detected at the first terminal node;

storing second polarization state data representing a state of polarization of the optical transmission line, the second polarization state data being detected at a second terminal node of the one set of terminal nodes;

detecting a first time representing a time at which a polarization fluctuation component caused by a polarization fluctuation generated in the optical transmission line arrives at the first terminal node by comparing a polarization fluctuation value representing a fluctuation speed of the polarization detected in the first terminal node with a specified threshold level;

generating reference data by extracting the first polarization state data near the first time;

detecting a second time representing a time at which a polarization fluctuation component caused by the polarization fluctuation arrives at the second terminal node by searching for a section having a polarization state similar to the polarization state represented by the reference data in the second polarization state data; and determining a polarization fluctuation position representing a position where the polarization fluctuation occurs based on the first time and the second time.

* * * * *